(12) United States Patent  (10) Patent No.: US 8,290,403 B2
Ueno (45) Date of Patent: Oct. 16, 2012

(54) ROTARY DRIVING DEVICE AND IMAGE FORMING APPARATUS

(75) Inventor: Daijirou Ueno, Osaka (JP)

(73) Assignee: Kyocera Mita Corporation (JP)

( * ) Notice: Subject to any disclaimer, the term of this patent is extended or adjusted under 35 U.S.C. 154(b) by 715 days.

(21) Appl. No.: 12/466,478

(22) Filed: May 15, 2009

(65) Prior Publication Data

US 2009/0282991 A1  Nov. 19, 2009

(30) Foreign Application Priority Data

May 19, 2008 (JP) .................................. 2008-130688

(51) Int. Cl.
*G03G 15/00* (2006.01)
*B41F 17/08* (2006.01)

(52) U.S. Cl. ........ 399/210; 399/107; 399/167; 101/38.1

(58) Field of Classification Search .................. 399/107, 399/167, 210; 101/38.1
See application file for complete search history.

(56) References Cited

U.S. PATENT DOCUMENTS

| 5,881,342 | A | * | 3/1999 | Makino et al. | 399/167 |
| 6,023,596 | A | * | 2/2000 | Makino | 399/167 |
| 6,456,807 | B1 | * | 9/2002 | Makino et al. | 399/167 |
| 6,522,849 | B2 | * | 2/2003 | Makino et al. | 399/159 |
| 8,064,800 | B2 | * | 11/2011 | Carter et al. | 399/167 |
| 2001/0010192 | A1 | * | 8/2001 | Ozaki | 101/216 |
| 2002/0001483 | A1 | * | 1/2002 | Makino et al. | 399/159 |
| 2006/0051133 | A1 | * | 3/2006 | Koishi et al. | 399/167 |
| 2007/0189805 | A1 | * | 8/2007 | Takigawa | 399/111 |
| 2008/0138113 | A1 | * | 6/2008 | Murrell et al. | 399/167 |
| 2011/0249988 | A1 | * | 10/2011 | Miura | 399/167 |

FOREIGN PATENT DOCUMENTS

| JP | 2002-195348 | | 7/2002 |
| JP | 2002195348 | A  * | 7/2002 |

* cited by examiner

*Primary Examiner* — David Gray
*Assistant Examiner* — Francis Gray
(74) *Attorney, Agent, or Firm* — Gerald E. Hespos; Michael J. Porco

(57) ABSTRACT

A rotary driving device includes a rotary shaft supported rotatably about an axis thereof on a predetermined supporting member, a rotary load body mounted on the rotary shaft to project radially outward from the rotary shaft in such a manner that the rotary load body can rotate integrally with the rotary shaft about the axis thereof, a driver for rotating the rotary shaft about the axis thereof, a disk mounted on the rotary shaft coaxially therewith for integral rotation with the rotary shaft, the disk having a mounting hole formed therein, a pendulum loosely fitted in the mounting hole, and an adjustment mechanism for adjusting a relative position relationship between a central axis position of the mounting hole and a center of gravity position of the pendulum under conditions where the disk is rotating.

4 Claims, 11 Drawing Sheets

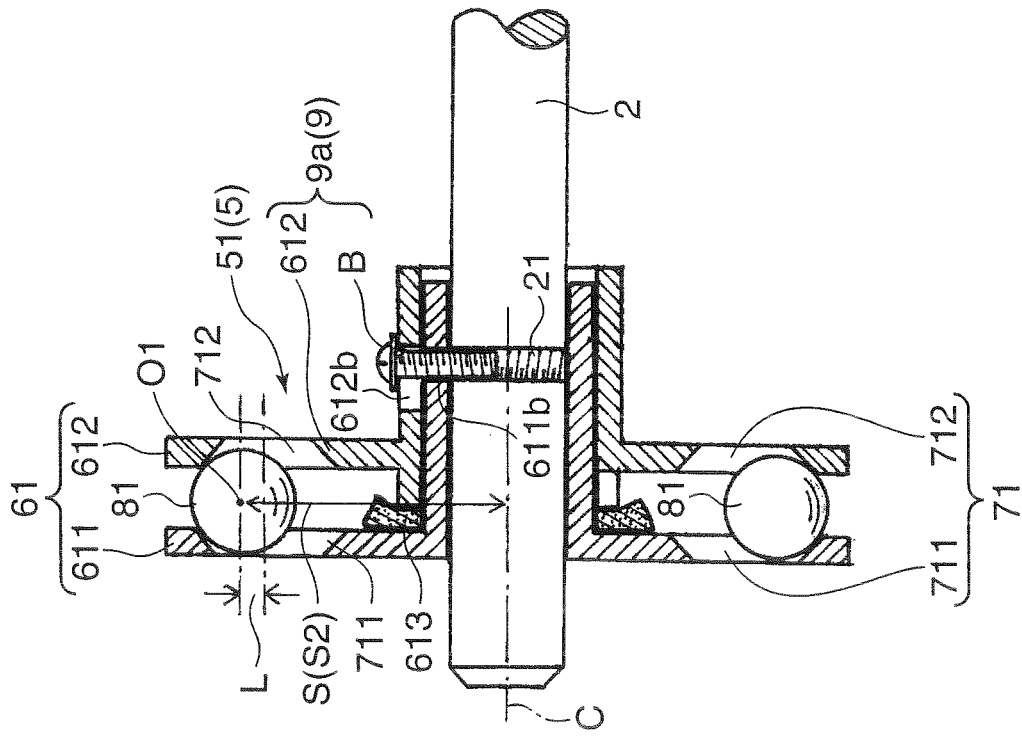
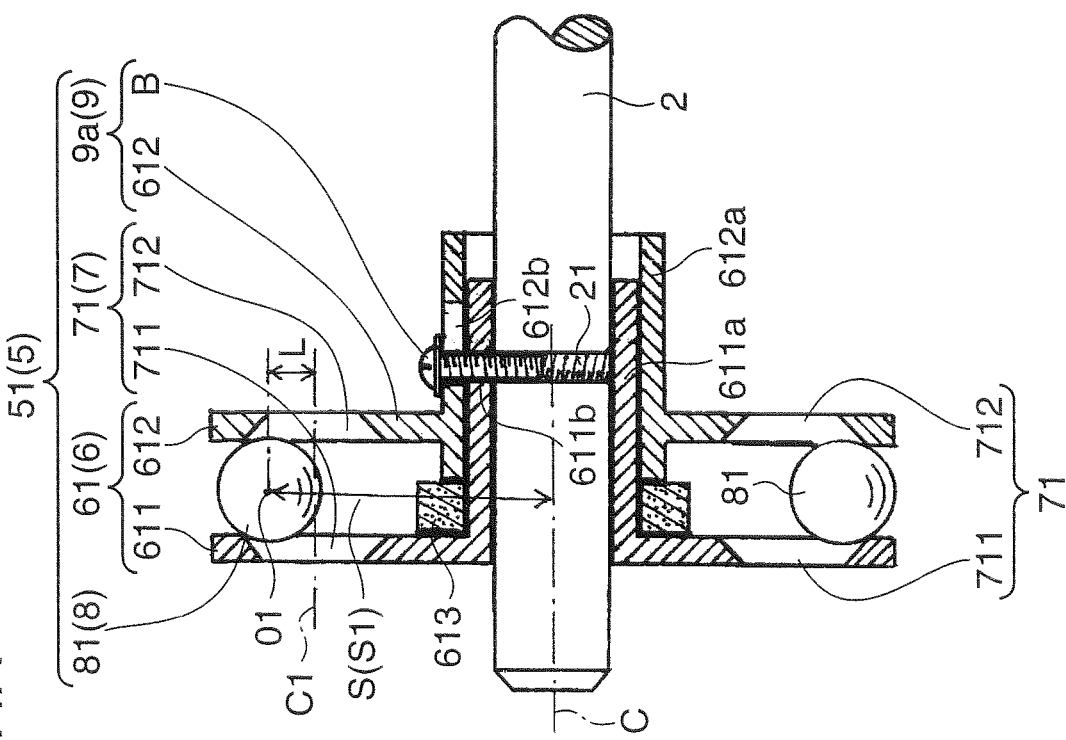

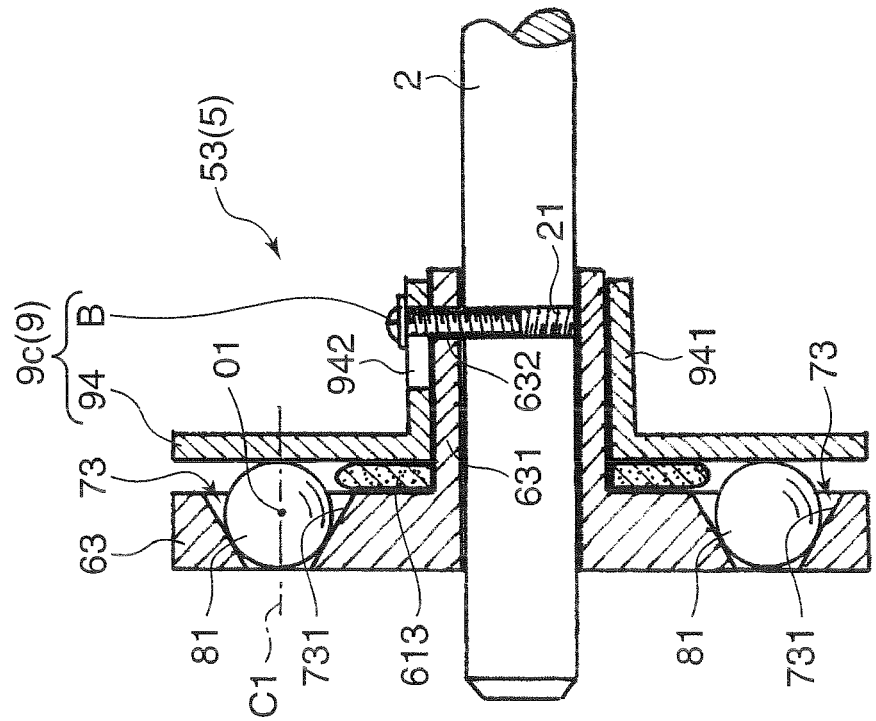
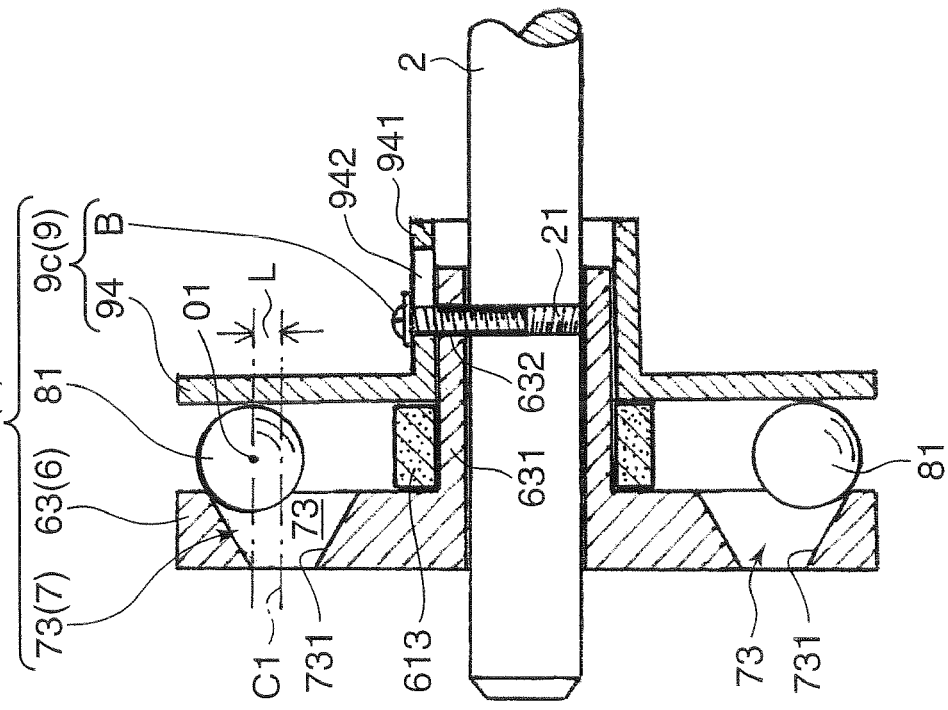

ROTARY DRIVING DEVICE AND IMAGE FORMING APPARATUS

BACKGROUND OF THE INVENTION

1. Field of the Invention

The present invention relates to a rotary driving device having a rotary load body which is driven to rotate integrally about a rotary shaft. The present invention also relates to an image forming apparatus provided with such a rotary driving device.

2. Description of the Related Art

Japanese Laid-open Patent Publication No. 2002-195348 describes an example of a conventional rotary driving device which is applied to an image forming apparatus. The rotary driving device of this Publication includes a rotary body system for rotatably supporting a rotary body, a driving system having an electric motor serving as a rotary driving source for driving the rotary body system to rotate, and a driving/transmission system interconnecting the rotary body system and the driving system.

The rotary body system includes a rotary shaft on which the rotary body is so mounted as to be able to rotate integrally with the rotary shaft and a centrifugal pendulum vibration absorber which is so mounted on the rotary shaft as to be able to rotate integrally therewith. The rotary shaft is rotatably supported by a structural part like a frame via bearings. When the electric motor is actuated, the rotary shaft, the rotary body and the centrifugal pendulum vibration absorber rotate together as a single structure.

The centrifugal pendulum vibration absorber is provided for absorbing vibration of the rotary body which rotates integrally with the rotary shaft on a common axis, and is configured to include a disk which is so mounted on the rotary shaft as to be able to rotate integrally therewith, a plurality of circular holes formed in the disk to pass therethrough at equal intervals along a circumferential direction of the disk and cylindrical pendulums loosely fitted in the individual circular holes.

When the rotary body rotates as a result of actuation of the electric motor in the centrifugal pendulum vibration absorber thus configured, the pendulums loosely fitted in the individual circular holes oscillate therein while producing pendular motion along inner surfaces of the circular holes. Vibrational energy produced by rotation of the rotary body is absorbed by the pendular motion (oscillatory motion) of the pendulums, so that the rotary body is kept from vibrating.

Provided that the aforementioned centrifugal pendulum vibration absorber is so configured that there is a difference L between the radius of each circular hole in the disk and that of each pendulum, the center of the disk is separated from the center of each circular hole by a distance R and the disk rotates at an angular velocity $\omega$, a natural frequency $\omega_n$ of vibration of each pendulum is known to be given by the following equation:

$$\omega_n = \omega\sqrt{R/L}$$

On the other hand, an actual frequency of vibration of the rotary body observed when the rotary body rotates at the angular velocity $\omega$ can be determined by calculation or from an experiment. Therefore, it is possible to match the natural frequency of vibration of each pendulum with the frequency of vibration of the rotary body by substituting a value of the actual frequency of vibration of the rotary body for $\omega_n$ in the aforementioned equation and properly setting values of L and R so that the equation is satisfied. Under conditions where the natural frequency of vibration of each pendulum is matched to the frequency of vibration of the rotary body, vibration produced when the rotary body rotates at the angular velocity $\omega$ is effectively absorbed by the oscillatory motion of the pendulums in theory.

In the rotary driving device of Japanese Laid-open Patent Publication No. 2002-195348, however, even if the difference L between the radius of each circular hole in the disk and that of each pendulum and the distance R between the center of the disk and the center of each circular hole are determined based on the aforementioned equation so that the natural frequency $\omega_n$ of vibration of each pendulum matches the frequency of vibration of the rotary body, and the circular holes are formed in the disk and the pendulums are adjusted according the setting of and L, there can be a case where a desired vibration absorbing effect can not be obtained due to errors in design or manufacture when the rotary body is actually rotated.

Also, if it is found that an appropriate vibration absorbing effect is not obtained after the circular holes are formed in the disk, it may be necessary to manufacture a new disk to achieve an intended result. Making a new disk would however results in increasing cost.

SUMMARY OF THE INVENTION

The invention is intended to provide a solution to the aforementioned problems of the prior art. Specifically, it is an object of the invention to provide a rotary driving device which can produce an improved vibration absorbing effect by properly adjusting vibration absorbing performance and contribute to a reduction in manufacturing cost by avoiding a waste of a disk once mounted on a rotary body for absorbing vibration. It is another object of the invention to provide an image forming apparatus provided with such a rotary driving device.

According to the present invention, a rotary driving device includes a rotary shaft supported rotatably about an axis thereof on a predetermined supporting member, a rotary load body mounted on the rotary shaft to project radially outward from the rotary shaft in such a manner that the rotary load body can rotate integrally with the rotary shaft about the axis thereof, a driver for rotating the rotary shaft about the axis thereof, a disk mounted on the rotary shaft coaxially therewith for integral rotation with the rotary shaft, the disk having a mounting hole formed therein, a pendulum loosely fitted in the mounting hole, and an adjustment mechanism for adjusting a relative position relationship between a central axis position of the mounting hole and a center of gravity position of the pendulum under conditions where the disk is rotating.

These and other objects, features and advantages of the invention will become more apparent upon a reading of the following detailed description along with the accompanying drawings.

BRIEF DESCRIPTION OF THE DRAWINGS

FIGS. 4A and 4B are cross-sectional views taken along lines IV-IV of FIG. 3B, FIG. 4A showing a state in which a stationary disk element and a movable disk element are most separated from each other and FIG. 4B showing a state in which the stationary disk element and the movable disk element are located closest to each other.

FIGS. 8A and 8B are cross-sectional views taken along lines VIII-VIII of FIG. 7B, FIG. 8A showing a state in which each of spherical bodies is set at a position most separated from the rotary shaft and FIG. 8B showing a state in which the spherical bodies are located closest to the rotary shaft.

DETAILED DESCRIPTION OF THE PREFERRED EMBODIMENTS

Figure 1:
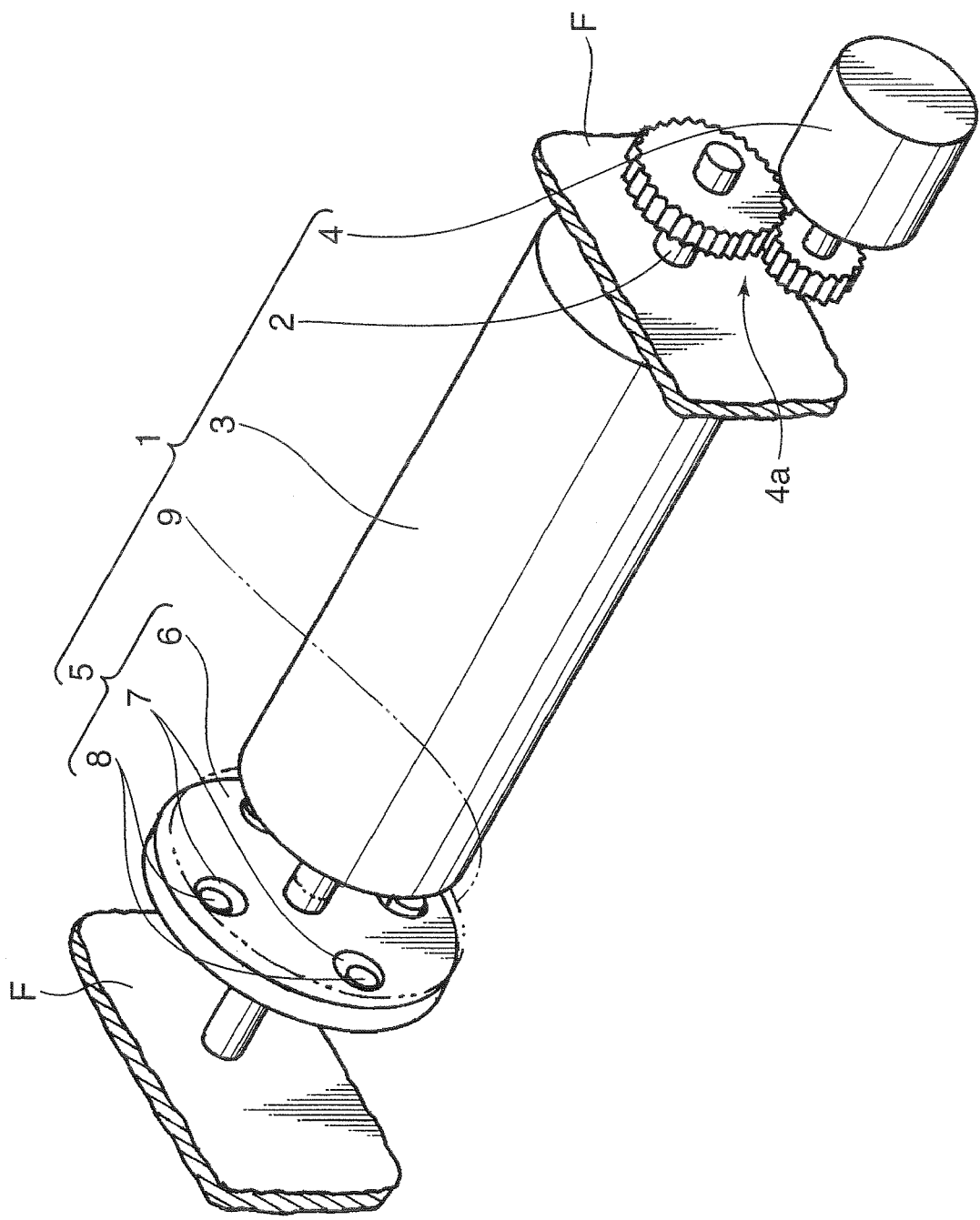
FIG. 1 is a perspective view showing a basic structure of a rotary driving device according to the invention.

FIG. 1 is a perspective view showing a basic structure of a rotary driving device 1 according to the present invention. As shown in FIG. 1, the rotary driving device 1 includes a rotary shaft 2 mounted rotatably about an axis thereof between two frames (supporting member) F, a cylindrical rotary load body 3 which is fitted on the rotary shaft 2 to protrude radially outward therefrom along the entire circumference of the rotary shaft 2 so that the rotary load body 3 can rotate integrally with the rotary shaft 2 about the axis thereof, a driving motor (driver) 4 for rotating the rotary shaft 2 about the axis thereof, and a centrifugal pendulum vibration absorber 5 fitted on the rotary shaft 2 so that the centrifugal pendulum vibration absorber 5 can rotate integrally with the rotary shaft 2 on the same axis therewith.

There is provided a gear mechanism 4a between the driving motor 4 and the rotary shaft 2. A driving force of the driving motor 4 is transmitted to the rotary shaft 2 via the gear mechanism 4a, causing the rotary shaft 2 to rotate.

The centrifugal pendulum vibration absorber 5 includes a disk 6 fitted on the rotary shaft 2 on the same axis therewith so that the disk 6 can rotate integrally with the rotary shaft 2, a plurality of circular mounting holes 7 formed in the disk 6 at equal intervals along a circumferential direction of the disk 6, and centrifugal pendulums (pendulums) 8 loosely fitted in the individual mounting holes 7. While the disk 6 has four mounting holes 7 formed therein in the illustrated basic structure, the number of the mounting holes 7 is not limited to four but may be less than or more than four.

Figure 2:
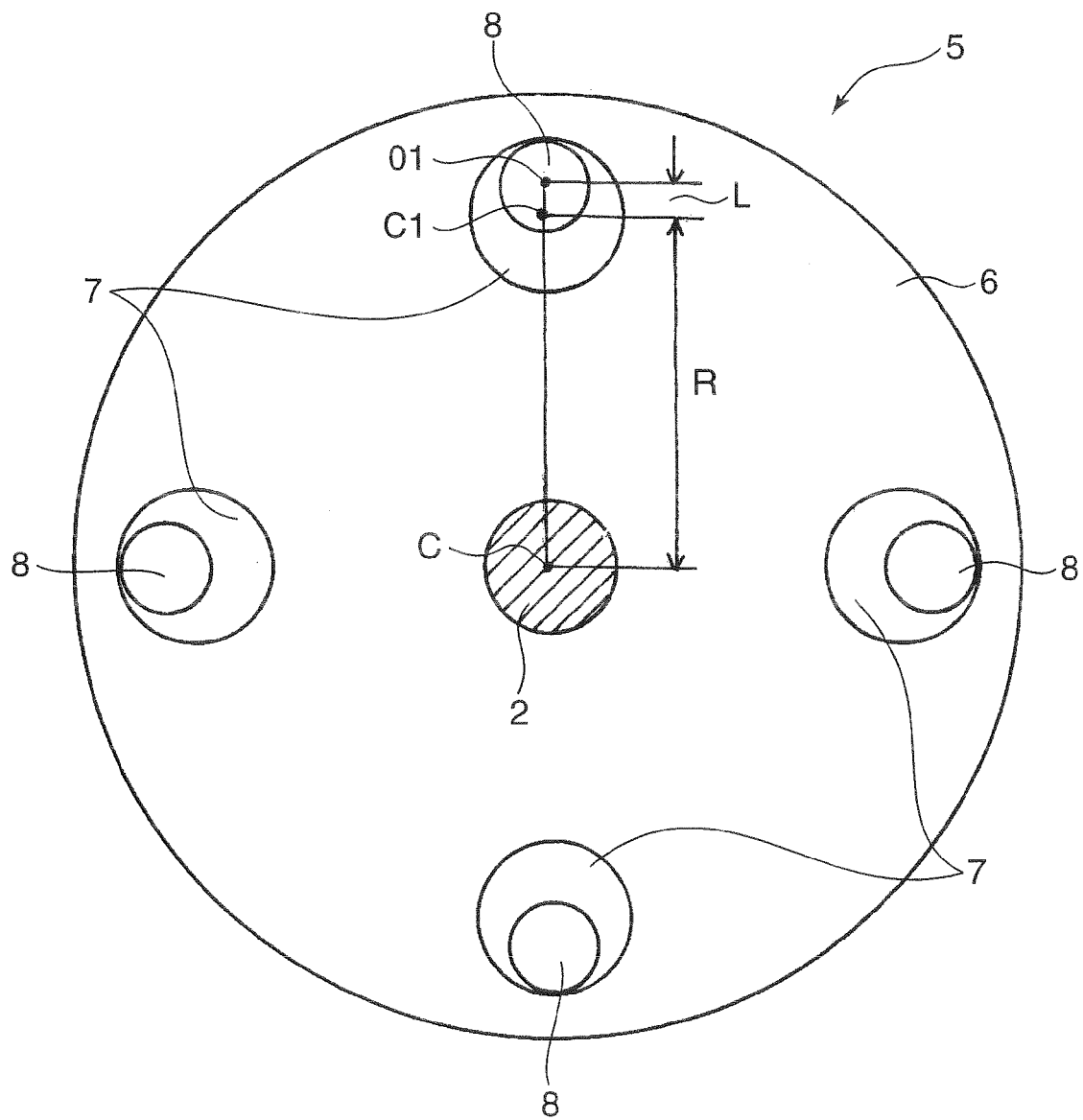
FIG. 2 is a front view of a centrifugal pendulum vibration absorber shown for explaining a natural frequency of vibration of a centrifugal pendulum.

FIG. 2 is a front view of the centrifugal pendulum vibration absorber 5 shown for explaining a natural frequency of vibration of each centrifugal pendulum 8. The disk 6 rotates about the rotary shaft 2 and FIG. 2 shows a state in which the centrifugal pendulums 8 are positioned radially most outward in the respective mounting holes 7 due to a centrifugal force produced by rotation of the disk 6 about the rotary shaft 2.

Provided that the centrifugal pendulum vibration absorber 5 shown in FIG. 2 is so configured that a center axis position C1 of each mounting hole 7 is separated from a center axis position C of the disk 6 by a distance R, a center position O1 of each centrifugal pendulum 8 is separated from the center axis position C1 of the pertinent mounting hole 7 by a distance L under conditions where an outer peripheral surface of each centrifugal pendulum 8 is in contact with an inner peripheral surface of the pertinent mounting hole 7, the disk 6 rotates at an angular velocity $\omega$, and each centrifugal pendulum 8 has a natural frequency $\omega_n$ of vibration, there is a relationship expressed by the following equation as previously mentioned:

$$\omega_n = \omega\sqrt{R/L} \qquad (1)$$

When the frequency of vibration of the rotary driving device 1 determined by gear meshing conditions, eccentricity of the rotary load body 3 and cogging or the like of the driving motor 4 is known, the centrifugal pendulum vibration absorber 5 will be brought into a state in which the centrifugal pendulums 8 completely absorb vibration of the rotary driving device 1 by setting the frequency of vibration of the rotary driving device 1 to be equal to the natural frequency of vibration of the centrifugal pendulums 8.

Therefore, the centrifugal pendulum vibration absorber 5 exhibits a maximum vibration absorbing effect if the aforementioned equation is satisfied, that is, by substituting the frequency of vibration of the rotary driving device 1 for $\omega_n$ and the angular velocity of the disk 6 for $\omega$ in equation (1) above and setting values of R and L so that equation (1) is satisfied. Even though the values of R and L are so set, however, the value of $\omega_n$ will not become equal to the frequency of vibration of the rotary driving device 1 if a dimensional error occurs in any of the mounting holes 7 or if the frequency of vibration of the rotary driving device 1 can not be exactly determined. Consequently, it will become impossible for the centrifugal pendulum vibration absorber 5 to exhibit a sufficient vibration absorbing effect in this case.

To cope with the aforementioned problem, the rotary driving device 1 of this embodiment is configured such that the centrifugal pendulum vibration absorber 5 has an adjustment mechanism 9 which makes it possible to vary the distance R between the center axis position C1 of each mounting hole 7 and the center axis position C of the disk 6.

Centrifugal pendulum vibration absorbers 51, 52, 53 according to first to third embodiments of the invention having different types of adjustment mechanisms 9 are described hereinbelow with reference to FIGS. 3A to 8B.

First Embodiment

Figure 3A:
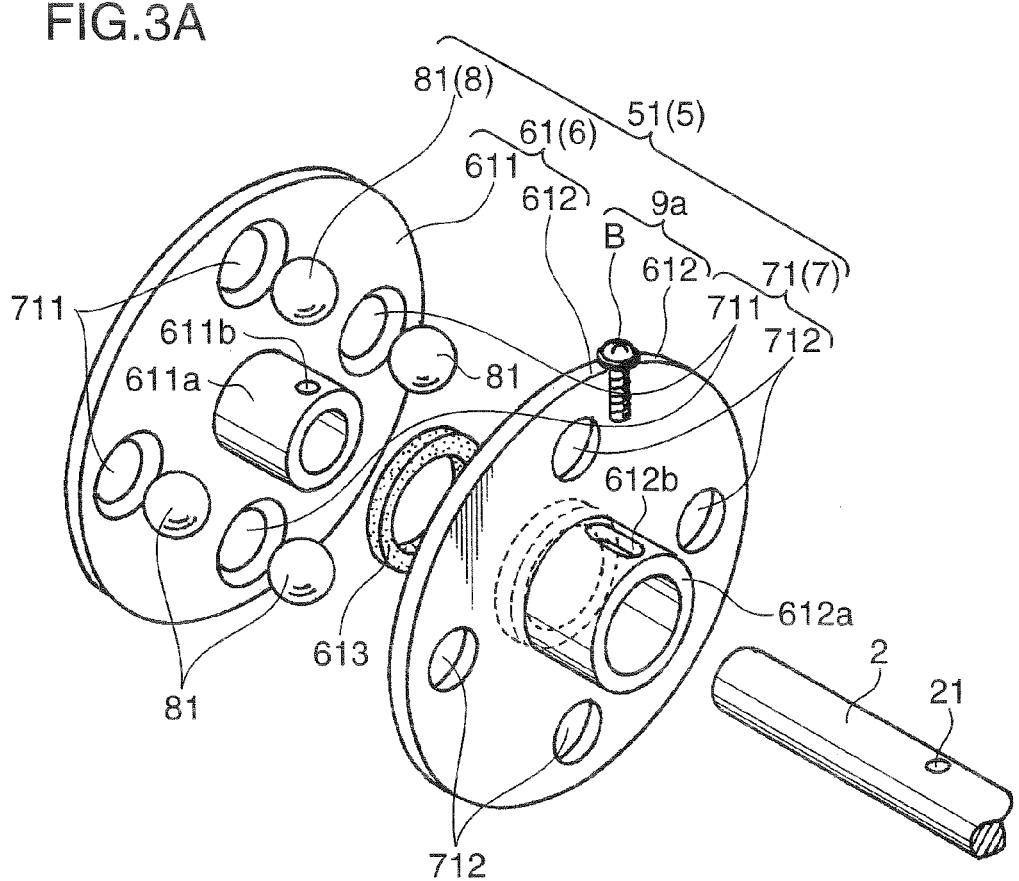
FIGS. 3A and 3B are perspective views of a centrifugal pendulum vibration absorber according to a first embodiment of the invention, FIG. 3A being an exploded perspective view and FIG. 3B being a perspective assembly view.
Figure 3B:
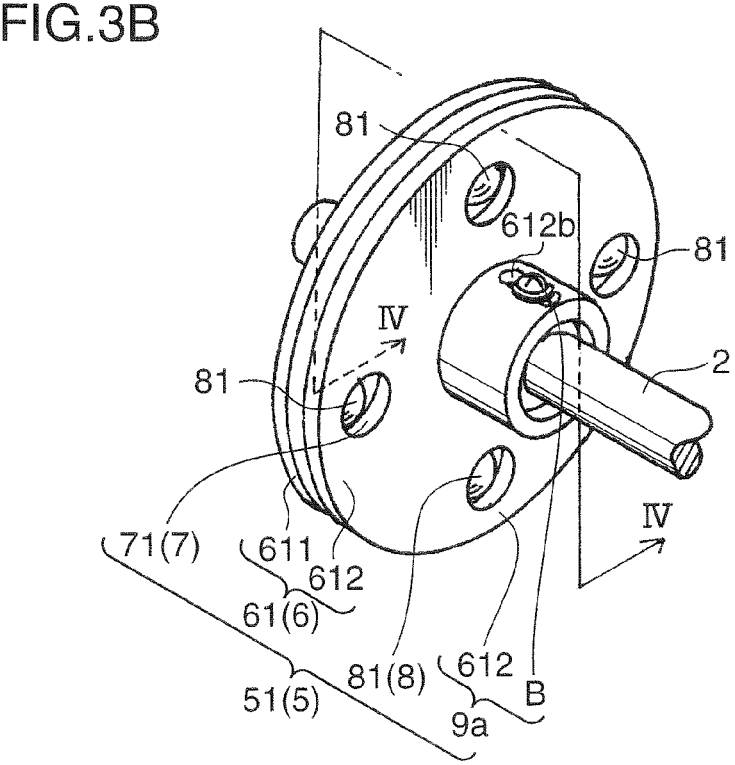

FIGS. 3A and 3B are perspective views of the centrifugal pendulum vibration absorber 51 according to the first embodiment, FIG. 3A being an exploded perspective view and FIG. 3B being a perspective assembly view. FIGS. 4A and 4B are cross-sectional views taken along lines IV-IV of FIG. 3B, FIG. 4A showing a state in which a stationary disk element 611 and a movable disk element 612 are most separated from each other and FIG. 4B showing a state in which the stationary disk element 611 and the movable disk element 612 are located closest to each other.

As shown in FIGS. 3A and 3B, the centrifugal pendulum vibration absorber 51 of the first embodiment includes a disk 61 having a dual-disk structure and a plurality of spherical bodies (pendulums) 81 fitted in mounting holes 71 formed in the disk 61.

The disk 61 includes the stationary disk element 611 which is mounted on the rotary shaft 2 in such a manner that the stationary disk element 611 is kept from moving along an axial direction of the rotary shaft 2 and the movable disk element 612 which is so mounted on the rotary shaft 2 to be movable along the axial direction on the right side of the stationary disk element 611 as illustrated in FIGS. 3A and 3B. The stationary disk element 611 has an inner cylindrical part 611a projecting from a right surface of the stationary disk element 611 on a common axis therewith (as illustrated in FIGS. 3A and 3B), and the movable disk element 612 has an outer cylindrical part 612a projecting therefrom on a common axis therewith. The inside diameter of the inner cylindrical part 611a is made slightly larger than the outside diameter of the rotary shaft 2, so that the rotary shaft 2 is passed through the inner cylindrical part 611a in sliding contact therewith.

The inside diameter of the outer cylindrical part 612a is made slightly larger than the outside diameter of the inner cylindrical part 611a, so that the outer cylindrical part 612a can be fitted on the inner cylindrical part 611a in sliding contact therewith. The inner cylindrical part 611a and the outer cylindrical part 612a are formed to have approximately the same length. Also, as illustrated in FIGS. 3A and 3B, the amount of leftward projection of the outer cylindrical part 612a from the movable disk element 612 is made slightly smaller than the diameter of each spherical body 81.

In the inner cylindrical part 611a, there is formed a through hole 611b passing radially through the inner cylindrical part 611a. Also, the rotary shaft 2 has a threaded hole 21 radially tapped therein at an appropriate position. On the other hand, in a portion of the outer cylindrical part 612a projecting rightward from the movable disk element 612, there is formed a slot 612b extending along an axial direction of the outer cylindrical part 612a and passing therethrough.

After aligning the slot 612b with the through hole 611b, the outer cylindrical part 612a of the movable disk element 612 is fitted on the inner cylindrical part 611a of the stationary disk element 611. Then, after fitting the rotary shaft 2 into the inner cylindrical part 611a so that the threaded hole 21 aligns with the through hole 611b, a screw (locking member) B is screwed into the threaded hole 21 through the slot 612b and the through hole 611b, whereby the stationary disk element 611 is kept from moving along the axial direction. On the other hand, the movable disk element 612 can be moved back and forth along the axial direction of the rotary shaft 2 within a particular movable range defined by the slot 612b.

Therefore, the movable disk element 612 is fixed to the rotary shaft 2 when the screw B is fastened after setting a desired distance between the stationary disk element 611 and the movable disk element 612 by moving the movable disk element 612 back and forth along the rotary shaft 2.

In the stationary disk element 611 and the movable disk element 612, there are formed at their surface the aforementioned plurality (four in each disk element 611, 612 in this embodiment) of mounting holes 71 at equal intervals along a circumferential direction so that the mounting holes 71 in the stationary disk element 611 align with those in the movable disk element 612. The mounting holes 71 formed in the stationary disk element 611 are hereinafter referred to as stationary disk element side mounting holes (first mounting holes) 711 and the mounting holes 71 formed in the movable disk element 612 are hereinafter referred to as movable disk element side mounting holes (second mounting holes) 712.

As shown in FIGS. 4A and 4B, each of the stationary disk element side mounting holes 711 formed in the stationary disk element 611 has a generally trumpet-like cross-sectional shape gradually increasing in diameter toward an opposing surface of the movable disk element 612. Similarly, each of the movable disk element side mounting holes 712 formed in the movable disk element 612 has a generally trumpet-like cross-sectional shape gradually increasing in diameter toward an opposing surface of the stationary disk element 611. The stationary disk element side mounting holes 711 and the movable disk element side mounting holes 712 are formed to have the same dimensions.

There is provided an adjuster 613 between the stationary disk element 611 and the movable disk element 612 while fitted on the inner cylindrical part 611a. The adjuster 613 of this embodiment is made of soft synthetic resin foam. Under conditions where the outer cylindrical part 612a of the movable disk element 612 is fitted on the inner cylindrical part 611a of the stationary disk element 611 and set in position by tightening the screw B, the adjuster 613 is caused to elastically deform by compression. As a consequence, the adjuster 613 exerts an elastic force which serves to hold the movable disk element 612 in a stably mounted state.

The spherical bodies 81 are made to have a diameter slightly larger than a minimum inside diameter of each of the mounting holes 711, 712. Therefore, when fitted in the respective mounting holes 711, 712, the spherical bodies 81 are sandwiched between the stationary disk element 611 and the movable disk element 612 as shown in FIGS. 4A and 4B and, thus, the spherical bodies 81 will not come out of the mounting holes 711, 712.

In the centrifugal pendulum vibration absorber 51 of the first embodiment, an adjustment mechanism 9a for adjusting a relative position relationship (i.e., the distance L shown in FIGS. 4A and 4B) between a center axis position C1 of each mounting hole 71 and a center position O1 (i.e., the center of gravity) of the corresponding spherical body 81 is configured with the movable disk element 612 which can be moved back and forth along the axial direction of the rotary shaft 2 and the screw B for keeping the movable disk element 612 from moving along the axial direction.

The centrifugal pendulum vibration absorber 51 of the first embodiment thus configured makes it possible to freely set the distance between the stationary disk element 611 and the movable disk element 612 by loosening the screw B and removing the same from the threaded hole 21 and through hole 611b of the inner cylindrical part 611a so that the stationary disk element 611 and the movable disk element 612 are in a desired state between the state shown in FIG. 4A in which the stationary disk element 611 and the movable disk element 612 are most separated from each other and the state shown in FIG. 4B in which the stationary disk element 611 and the movable disk element 612 are located closest to each other.

When the distance between the stationary disk element 611 and the movable disk element 612 is maximized as shown in FIG. 4A, a distance S between the center O1 of each spherical body 81, positioned radially outward due to a centrifugal force produced by rotary motion of the centrifugal pendulum vibration absorber 51 around the rotary shaft 2, and a center axis C of the rotary shaft 2 takes a maximum value S1. On the other hand, when the distance between the stationary disk element 611 and the movable disk element 612 is minimized as shown in FIG. 4B, the distance S between the center O1

(the center of gravity) of each spherical body 81 and the center axis C of the rotary shaft 2 takes a minimum value S2.

The above-described arrangement of the first embodiment makes it possible to arbitrarily set the distance S between the center O1 of each spherical body 81 and the center axis C of the rotary shaft 2 in the range between the maximum value S1 and the minimum value S2 under conditions where the centrifugal pendulum vibration absorber 51 rotates by moving the movable disk element 612 within the movable range thereof back and forth along the axial direction of the rotary shaft 2. This means that vibration absorbing performance of the centrifugal pendulum vibration absorber 51 can be corrected, if inappropriate, by fine adjustment of the distance S between the center O1 of each spherical body 81 and the center axis C of the rotary shaft 2 performed by adjusting the distance between the stationary disk element 611 and the movable disk element 612 on a trial-and-error basis.

Second Embodiment

Figure 5A:
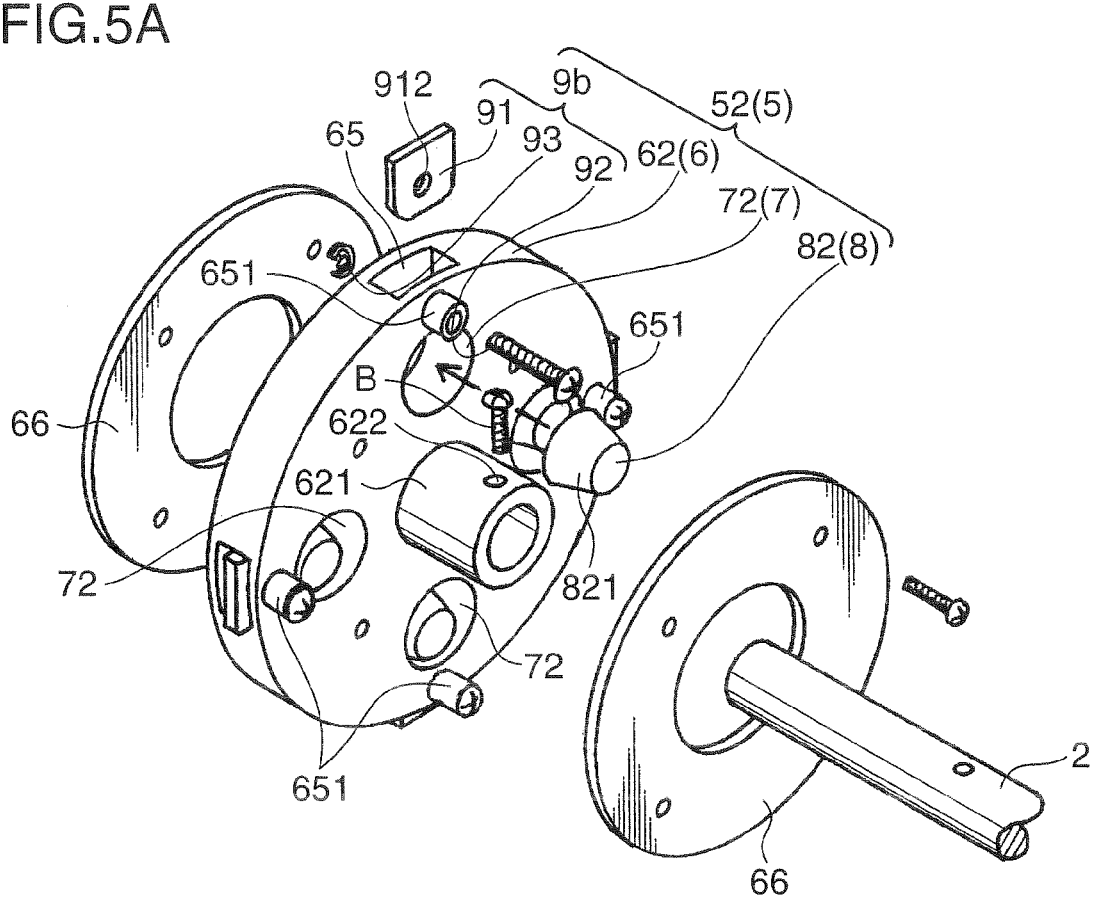
FIGS. 5A and 5B are perspective views of a centrifugal pendulum vibration absorber according to a second embodiment of the invention, FIG. 5A being an exploded perspective view and FIG. 5B being a perspective assembly view.
Figure 5B:
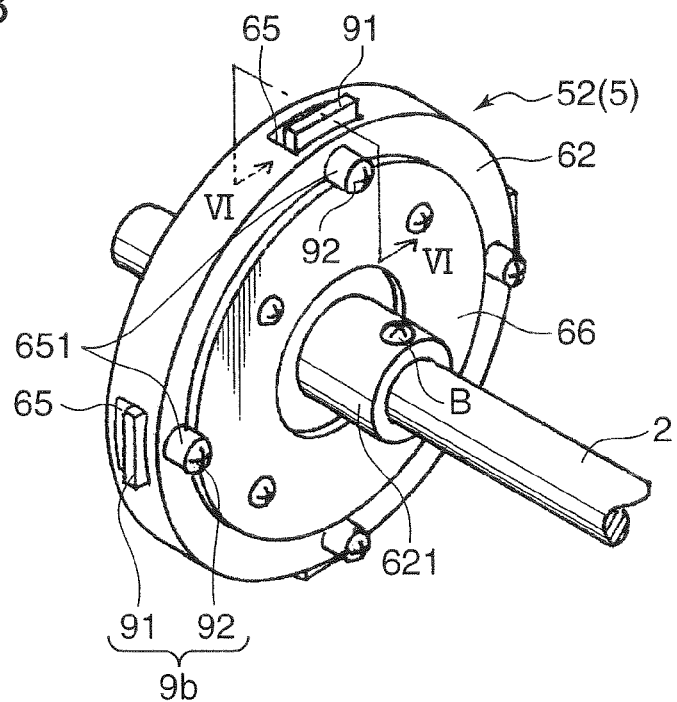
Figure 6A:
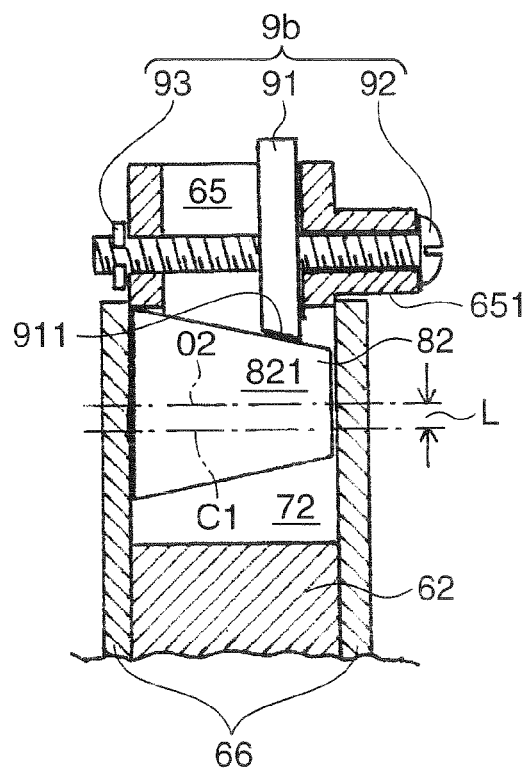
FIGS. 6A and 6B are cross-sectional views taken along lines VI-VI of FIG. 5B, FIG. 6A showing a state in which each of truncated conical bodies is most separated from a rotary shaft and FIG. 6B showing a state in which each of the truncated conical bodies is located closest to the rotary shaft.
Figure 6B:
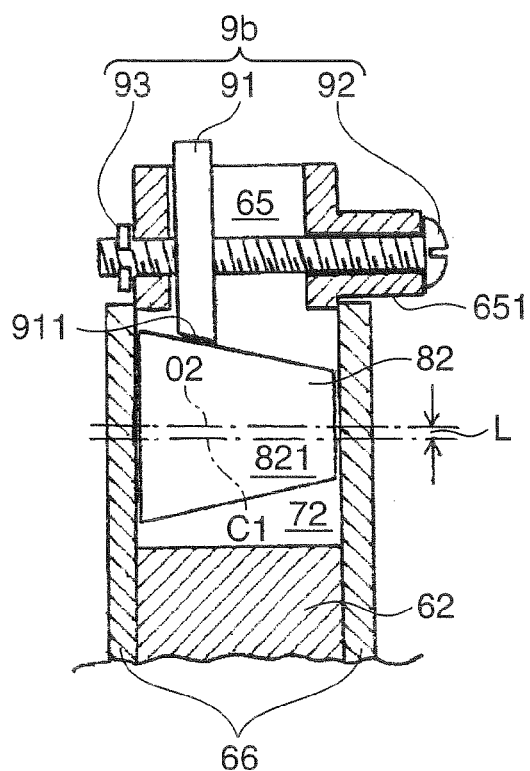
Figure 6C:
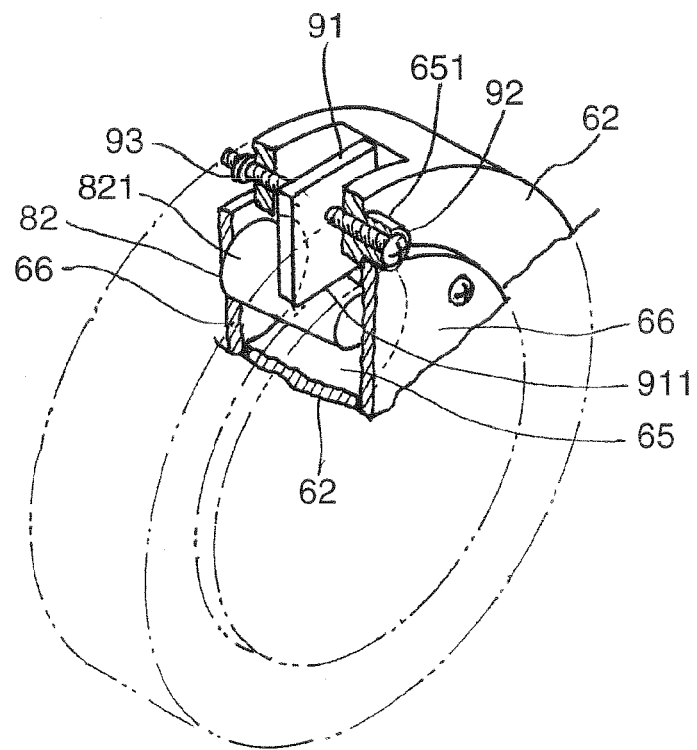
FIG. 6C is a fragmentary perspective view cut away along lines VI-VI of FIG. 5B.

FIGS. 5A and 5B are perspective views of the centrifugal pendulum vibration absorber 52 according to the second embodiment, FIG. 5A being an exploded perspective view and FIG. 5B being a perspective assembly view. FIGS. 6A and 6B are cross-sectional views taken along lines VI-VI of FIG. 5B, FIG. 6A showing a state in which each of truncated conical bodies 82 is most separated from the rotary shaft 2 and FIG. 6B showing a state in which each of the truncated conical bodies 82 is located closest to the rotary shaft 2. FIG. 6C is a fragmentary perspective view cut away along lines VI-VI of FIG. 5B.

As shown in FIGS. 5A and 5B, the centrifugal pendulum vibration absorber 52 of the second embodiment includes a generally thick-walled partially hollowed disk 62 which is fixedly fitted on the rotary shaft 2 on a common axis therewith, the partially hollowed disk 62 having a plurality of cutout spaces (cavities) 65 formed therein as will be described later, a plurality (four in this embodiment) of mounting holes 72 formed in the partially hollowed disk 62 at equal intervals along a circumferential direction thereof, the aforementioned plurality of truncated conical bodies (pendulums) 82 fitted in the corresponding mounting holes 72, and adjustment mechanisms 9b for adjusting a relative position relationship (i.e., the distance L) between a center axis position C1 of each mounting hole 72 and a center axis O2 (FIGS. 6A and 6B) of the corresponding truncated conical body 82.

The partially hollowed disk 62 has a cylindrical projecting part 621 protruding rightward from a right surface of the partially hollowed disk 62 as illustrated in FIG. 5A, as if passing through the partially hollowed disk 62 at a center position thereof. The inside diameter of the cylindrical projecting part 621 is made slightly larger than the outside diameter of the rotary shaft 2, so that the rotary shaft 2 can be passed through the cylindrical projecting part 621 in sliding contact therewith. In the cylindrical projecting part 621, there is formed a through hole 622 passing radially through the cylindrical projecting part 621 so that a screw B can be fitted in the through hole 622. When the screw B is tightly screwed into the threaded hole 21 in the rotary shaft 2 through the through hole 622, the partially hollowed disk 62 can rotate integrally with the rotary shaft 2 about the axis thereof.

The partially hollowed disk 62 has the aforementioned plurality of cutout spaces or cavities 65 which are formed by cutting out portions of the partially hollowed disk 62 inward toward the mounting holes 72 from an outer peripheral surface of the partially hollowed disk 62 at locations corresponding to the corresponding mounting holes 72. These cutout spaces 65 are for fitting the truncated conical bodies 82 which will be described later in detail. On the right surface of the partially hollowed disk 62 (as illustrated in FIG. 5A), there are formed a plurality of bushes 651 protruding rightward at locations corresponding to the respective cutout spaces 65. These bushes 651 serve to support later-described adjusting screws 92 in a stable state.

As illustrated in FIG. 5A, each of the truncated conical bodies 82 is shaped such that a right end surface has a minimum diameter and a left end surface has a maximum diameter, so that each of the truncated conical bodies 82 diminishes from the left end surface to the right end surface, forming a tapered circumferential surface 821. The maximum diameter of each truncated conical body 82 (i.e., the diameter of the left end surface of each truncated conical body 82 shown in FIG. 5A) is made slightly smaller than the diameter of each mounting hole 72 and the thickness of each truncated conical body 82 is made approximately equal to that of the partially hollowed disk 62.

In the second embodiment, a pair of ring-like stopper plates 66 are screwed to the partially hollowed disk 62 on both sides as shown in FIG. 5B for closing off the individual mounting holes 72 to prevent the truncated conical bodies 82 fitted in the mounting holes 72 from coming off. In this configuration, each truncated conical body 82 fitted in the mounting hole 72 is allowed to freely move in a direction perpendicular to an axial direction (i.e., in a radial direction) within the mounting hole 72 under conditions where movement of each truncated conical body 82 in the axial direction within the partially hollowed disk 62 is restricted by the pair of ring-like stopper plates 66.

Each of the adjustment mechanisms 9b includes an adjusting tab 91 fitted in the pertinent cutout space 65 such that the adjusting tab 91 can move back and forth along a thickness direction of the partially hollowed disk 62, the aforementioned adjusting screw 92 serving as a moving member for moving the adjusting tab 91 back and forth in the cutout space 65 along the thickness direction of the partially hollowed disk 62, the adjusting screw 92 being fitted in the pertinent cutout space 65 passing through the bush 651 and the adjusting tab 91, and an E-ring 93 fitted on a left end of the adjusting screw 92 (as illustrated in FIGS. 6A and 6B) so that the adjusting screw 92 will not come off under conditions where the adjusting screw 92 is passed through the partially hollowed disk 62.

Each of the adjusting tabs 91 has a generally rectangular shape in front view as shown in FIG. 5A. Each adjusting tab 91 has a thickness approximately one-quarter of the thickness (left-to-right dimension as illustrated in FIGS. 6A and 6B) of each cutout space 65 and a width (i.e., a circumferential dimension measured when each adjusting tab 91 is fitted in the pertinent cutout space 65) slightly smaller than the circumferential dimension of the cutout space 65. An end surface of each adjusting tab 91 facing the center of the partially hollowed disk 62 is shaped to form a tapered peripheral surface 911 which remains in contact with the tapered circumferential surface 821 of the pertinent truncated conical body 82. Also, each adjusting tab 91 has a threaded hole 912 formed therein into which the adjusting screw 92 is screwed.

Under conditions where each adjusting tab 91 fitted within the pertinent cutout space 65 with the tapered peripheral surface 911 facing the center of the partially hollowed disk 62, the adjusting screw 92 is inserted into the cutout space 65 through the bush 651 and tightened into the threaded hole 912 in the adjusting tab 91. The adjusting screw 92 passes to the outside of the partially hollowed disk 62 through a hole formed in a wall surface of the partially hollowed disk 62 located on an opposite side of the bush 651 of each cutout space 65. The E-ring 93 is fitted on that part of the adjusting screw 92 which protrudes to the outside of the partially hollowed disk 62. Consequently, the adjusting screws 92 are screwed into the respective adjusting tabs 91 to support the adjusting tabs 91 and thus fitted in the partially hollowed disk 62 in such a manner that the adjusting screws 92 will not come off.

When the partially hollowed disk 62 rotates on the rotary shaft 2, a centrifugal force produced by the rotary motion of the partially hollowed disk 62 causes the truncated conical bodies 82 to move radially outward within the respective mounting holes 72 so that the tapered circumferential surfaces 821 of the truncated conical bodies 82 go into contact with the tapered peripheral surfaces 911 of the respective adjusting tabs 91.

The centrifugal pendulum vibration absorber 52 of the second embodiment thus configured makes it possible to move each adjusting tab 91, into which the adjusting screw 92 is screwed, back and forth within the cutout space 65 along the thickness direction of the partially hollowed disk 62 by turning the pertinent adjusting screw 92 clockwise and counterclockwise about an axis thereof. The above-described arrangement of the second embodiment makes it possible to set the adjusting tabs 91 at a desired position between the state shown in FIG. 6A in which each adjusting tab 91 is located most rightward and the state shown in FIG. 6B in which each adjusting tab 91 is located most leftward.

When each adjusting tab 91 is located most rightward, the tapered peripheral surface 911 of each adjusting tab 91 is in contact with a right part of the tapered circumferential surface 821 of the pertinent truncated conical body 82 so that the truncated conical body 82 is set at a position most separated from the rotary shaft 2.

On the other hand, when each adjusting tab 91 is located most leftward, the tapered peripheral surface 911 of each adjusting tab 91 is in contact with a left part of the tapered circumferential surface 821 of the pertinent truncated conical body 82 so that the truncated conical body 82 is set at a position closest to the rotary shaft 2.

Since the centrifugal pendulum vibration absorber 52 of the second embodiment makes it possible to easily vary the distance between the truncated conical bodies 82 and the rotary shaft 2 by moving the adjusting tabs 91 back and forth, it is possible to find a position of each truncated conical body 82 best suited for obtaining desired vibration absorbing performance on a trial-and-error basis.

Also, since the positions of the truncated conical bodies 82 can be adjusted individually, it is possible to perform a fine adjustment for obtaining the desired vibration absorbing performance compared to a case where all of the centrifugal pendulums 8 are adjusted likewise as a whole.

Third Embodiment

Figure 7A:
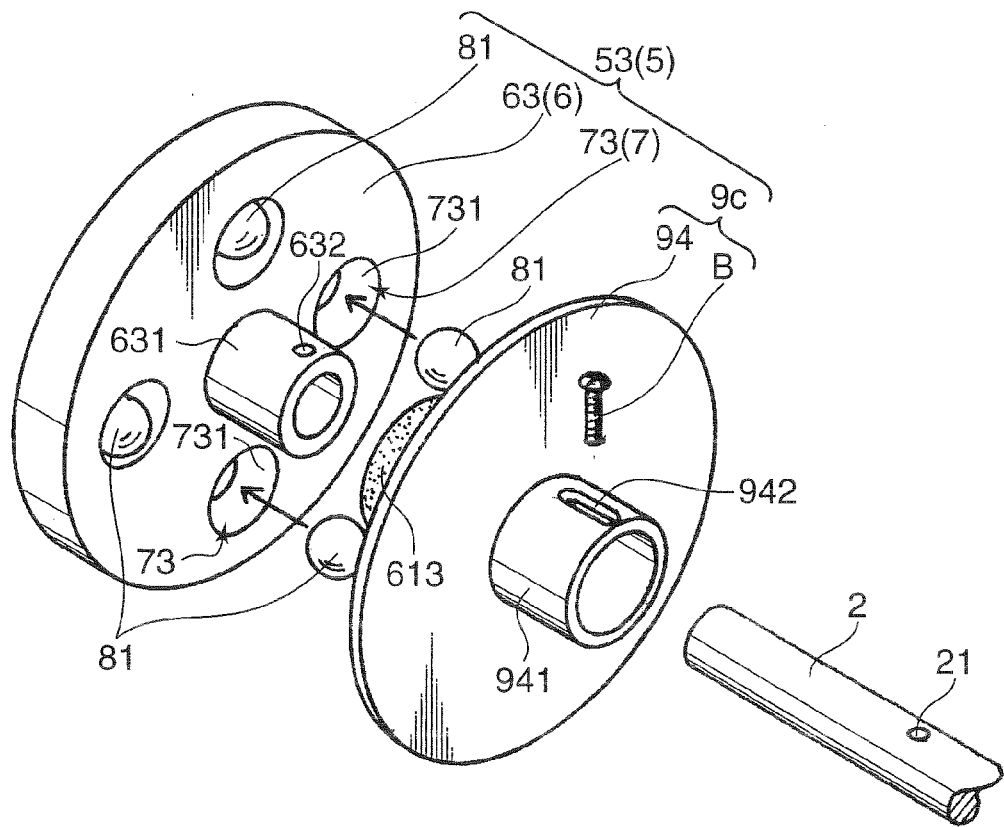
FIGS. 7A and 7B are perspective views of a centrifugal pendulum vibration absorber according to a third embodiment of the present invention, FIG. 7A being an exploded perspective view and FIG. 7B being a perspective assembly view.
Figure 7B:
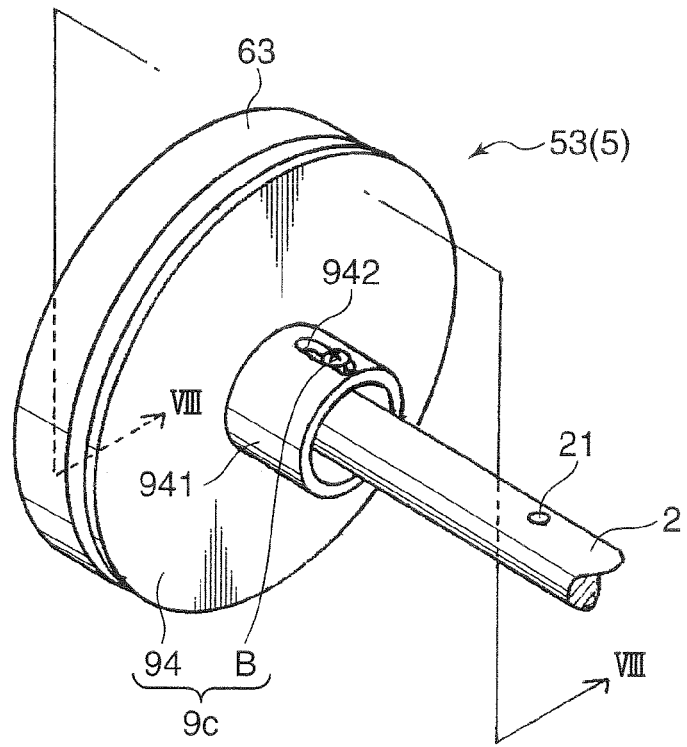

FIGS. 7A and 7B are perspective views of the centrifugal pendulum vibration absorber 53 according to the third embodiment, FIG. 7A being an exploded perspective view and FIG. 7B being a perspective assembly view. FIGS. 8A and 8B are cross-sectional views taken along lines VIII-VIII of FIG. 7B, FIG. 8A showing a state in which each of spherical bodies 81 is set at a position most separated from the rotary shaft 2 and FIG. 8B showing a state in which the spherical bodies 81 are located closest to the rotary shaft 2.

As shown in FIG. 7A, the centrifugal pendulum vibration absorber 53 of the third embodiment includes a single thick-walled disk 63 which is fixedly mounted on the rotary shaft 2 on a common axis therewith, a plurality (four in this embodiment) of conical holes (mounting holes) 73 formed in the thick-walled disk 63 at equal intervals along a circumferential direction thereof, the aforementioned plurality of spherical bodies (pendulums) 81 fitted in the respective conical holes 73, and an adjustment mechanism 9c for adjusting a relative position relationship between a center axis position C1 of each conical hole 73 and a center position O1 (i.e., the center of gravity) of the corresponding spherical body 81.

The thick-walled disk 63 has a cylindrical projecting part 631 protruding rightward from a right surface of the thick-walled disk 63 as illustrated in FIG. 7A, as if passing through the thick-walled disk 63 at a center position thereof. The inside diameter of the cylindrical projecting part 631 is made slightly larger than the outside diameter of the rotary shaft 2, so that the rotary shaft 2 can be inserted through the cylindrical projecting part 631 in sliding contact therewith. In the cylindrical projecting part 631, there is formed a through hole 632 passing radially through the cylindrical projecting part 631 so that a screw (locking member) B can be fitted in the through hole 632. When the screw B is tightly screwed into a threaded hole 21 in the rotary shaft 2 through a slot 942 formed in a later-described outer cylindrical part (projecting part) 941 and the through hole 632, the thick-walled disk 63 can rotate integrally with the rotary shaft 2 about the axis thereof.

Each of the conical holes 73 has a generally trumpet-like cross-sectional shape gradually increasing in diameter from a left side of the thick-walled disk 63 to a right side thereof as illustrated in FIG. 7A. An inner peripheral surface of each conical hole 73 is shaped to form a tapered circumferential surface 731.

The diameter of each spherical body 81 is made slightly larger than a minimum diameter of each conical hole 73 on a left side thereof as illustrated in FIGS. 8A and 8B. Therefore, the spherical bodies 81 will not come off leftward from the conical holes 73.

The adjustment mechanism 9c includes a positioning disk 94 for positioning the spherical bodies 81 under conditions where the spherical bodies 81 fitted in the respective conical holes 73 are kept from coming off leftward as illustrated in FIG. 7A, and the aforementioned screw B for fixing the positioning disk 94 to the rotary shaft 2 through the through hole 632 in the cylindrical projecting part 631.

The positioning disk 94 has the aforementioned outer cylindrical part 941 projecting rightward therefrom on a common axis with the positioning disk 94 as illustrated in FIGS. 7A and 7B. The inside diameter of the outer cylindrical part 941 is made slightly larger than the outside diameter of the cylindrical projecting part 631. Therefore, when the outer cylindrical part 941 is fitted over the cylindrical projecting part 631, the positioning disk 94 can be moved back and forth along a direction in which the cylindrical projecting part 631 extends.

The aforementioned slot 942 is formed in the outer cylindrical part 941 of the positioning disk 94 to extend in an axial direction thereof at a location corresponding to the through hole 632 in the cylindrical projecting part 631. With the outer cylindrical part 941 of the positioning disk 94 fitted on the cylindrical projecting part 631 of the thick-walled disk 63, the rotary shaft 2 is inserted into the cylindrical projecting part 631. Then, with the slot 942 in the outer cylindrical part 941, the through hole 632 in the cylindrical projecting part 631 and the threaded hole 21 in the rotary shaft 2 aligned with one another, the screw B is passed through the slot 942 and the through hole 632 and screwed into the threaded hole 21. As a consequence, the centrifugal pendulum vibration absorber 53 of the third embodiment is assembled as illustrated in FIG. 7B.

In the third embodiment, an adjuster 613 like that of the first embodiment is placed between the thick-walled disk 63 and the positioning disk 94. This arrangement serves to mount the positioning disk 94 in position to the thick-walled disk 63 in a stable state.

In the centrifugal pendulum vibration absorber 53 of the third embodiment thus configured, the positioning disk 94 can be moved back and forth along the axial direction of the rotary shaft 2 within a particular movable range defined by the slot 942 in the outer cylindrical part 941 upon loosening the screw B. When the centrifugal pendulum vibration absorber 53 rotates about the rotary shaft 2 integrally therewith under conditions where the positioning disk 94 is located most rightward as illustrated in FIG. 8A, the spherical bodies 81 fitted in the respective conical holes 73 move along the tapered circumferential surfaces 731 thereof and are positioned most outward in radial directions due to a centrifugal force produced by the rotary motion of the centrifugal pendulum vibration absorber 53. In this condition, the difference L between the center axis position C1 of each conical hole 73 and the center position O1 (i.e., the center of gravity) of the corresponding spherical body 81 takes a maximum value.

On the other hand, when the centrifugal pendulum vibration absorber 53 rotates about the rotary shaft 2 integrally therewith under conditions where the positioning disk 94 is located most leftward as illustrated in FIG. 8B, the individual spherical bodies 81 are forced leftward by the positioning disk 94 and thus positioned most inward along the radial directions in the respective conical holes 73. In this condition, the difference L between the center axis position C1 of each conical hole 73 and the center position O1 (i.e., the center of gravity) of the corresponding spherical body 81 takes a minimum value ("0" in the illustrated example of FIG. 8B).

The above-described arrangement of the third embodiment makes it possible to freely set each spherical body 81 at a desired position between the position most separated from the rotary shaft 2 as shown in FIG. 8A and the position closest to the rotary shaft 2 as shown in FIG. 8B by moving the positioning disk 94 back and forth along the axial direction of the rotary shaft 2. If the screw B is tightened under conditions where each spherical body 81 has been set in the desired position in the aforementioned fashion, the positioning disk 94 properly positioned relative to the thick-walled disk 63 is held stably mounted thereto.

As thus far described in detail, the rotary driving device 1 according to the foregoing embodiments includes the rotary shaft 2 mounted rotatably about the axis thereof between the predetermined frames F, the rotary load body 3 which is fitted on the rotary shaft 2 to project radially outward therefrom so that the rotary load body 3 can rotate integrally with the rotary shaft 2 about the axis thereof, the driving motor 4 for rotating the rotary shaft 2 about the axis thereof, and the centrifugal pendulum vibration absorber 5 fitted on the rotary shaft 2 so that the centrifugal pendulum vibration absorber 5 can rotate integrally with the rotary shaft 2 on the same axis therewith as shown in FIGS. 1 and 2.

The centrifugal pendulum vibration absorber 5 includes the disk 6 in which the mounting holes 7 are formed to pass therethrough at equal intervals along the circumferential direction of a single circle (having one fixed radius), and the adjustment mechanism 9 for adjusting the relative position relationship between the center axis position of each mounting hole 7 and the center position (center of gravity) of the corresponding centrifugal pendulum 8.

In the rotary driving device 1 thus configured, it is possible to absorb vibration of the rotary driving device 1 produced when the driving motor 4 is actuated to rotate the rotary shaft 2 about the axis thereof by oscillatory motion of the centrifugal pendulums 8 fitted in the respective mounting holes 7.

There can however be a case where an intended level of vibration absorbing effect is not obtained. In such a case, the relative position relationship between the center axis position of each mounting hole 7 and the center position (center of gravity) of the corresponding centrifugal pendulum 8 is to be finely adjusted so that the distance L between the center position O1 of each centrifugal pendulum 8 whose outer peripheral surface is in contact with the inner peripheral surface of the pertinent mounting hole 7 and the center axis position C1 of the pertinent mounting hole 7 would be varied. The distance L can be varied in this manner without varying the distance R between the center axis position C1 of each mounting hole 7 and the center axis position C of the disk 6 as mentioned in the aforementioned equation (1) or without varying the size of each centrifugal pendulum 8 (that is, by replacing the disk 6 or the centrifugal pendulums 8). This approach makes it possible to match the value of the natural frequency $\omega_n$ of vibration of the centrifugal pendulums 8 with the frequency of vibration of the rotary driving device 1 on a trial-and-error basis. Consequently, it is possible to provide an improved vibration absorbing effect with respect to the vibration of the rotary driving device 1 by producing proper oscillatory motion of the centrifugal pendulums 8.

Even after the disk 6 on which the mounting holes 7 are formed with the centrifugal pendulums 8 loosely fitted in the mounting holes 7 is once mounted on the rotary shaft 2, it is possible to effectively suppress the vibration of the rotary driving device 1 by means of the adjustment mechanism 9 on a trial-and-error basis as described above if a desired vibration absorbing effect is not obtained. Therefore, unlike the case of a conventional arrangement, it is not necessary to replace the disk 6 or the centrifugal pendulums 8 with new ones when the desired vibration absorbing effect is not obtained. This makes it possible to prevent a cost increase and an intricate task needed for replacing relevant components.

The adjustment mechanism 9a of the first embodiment shown in FIGS. 3A, 3B, 4A and 4B includes the movable disk element 612 slidably mounted on the rotary shaft 2 wherein the stationary disk element 611 has the stationary disk element side mounting holes 711 formed therein, each of the stationary disk element side mounting holes 711 constituting one part of the mounting hole 71, and the movable disk element 612 has the movable disk element side mounting holes 712 formed therein, each of the movable disk element side mounting holes 712 constituting another part of the mounting hole 71.

In the first embodiment, the centrifugal pendulums 8 of the present invention are configured with the spherical bodies 81 having a diameter larger than that of the mounting holes 71. The spherical bodies 81 are sandwiched between the stationary disk element 611 and the movable disk element 612 with each of the spherical bodies 81 loosely fitted in each pair of facing mounting holes 711, 712. The adjustment mechanism 9a also includes the locking member (screw B) for keeping the movable disk element 612 from moving.

In the aforementioned structure, the movable disk element 612 is moved back and forth along the rotary shaft 2 to vary the distance between the stationary disk element 611 and the movable disk element 612 and, then, the movable disk element 612 is fixed by securing the locking member in position. As the movable disk element 612 is fixed in this fashion, it is possible to vary the distance between the center axis of the rotary shaft 2 and the center of gravity position of each spherical body 81 when a centrifugal force produced by rotation of the rotary shaft 2 about the center axis thereof is exerted on the spherical bodies 81. It is possible to improve the vibration absorbing effect by finely adjusting the aforementioned distance.

The movable disk element 612 has the outer cylindrical part 612a projecting in the axial direction of the rotary shaft 2 from a surface of the movable disk element 612 opposite to a surface thereof facing the stationary disk element 611. The outer cylindrical part 612a has the slot 612b formed therein, the slot 612b extending along the axial direction of the rotary shaft 2, and the rotary shaft 2 has the threaded hole 21 tapped into an outer peripheral surface of the rotary shaft 2 at a location corresponding to the slot 612b. In this structure, the screw B screwed into the threaded hole 21 through the slot 612b is used as the aforementioned locking member.

Therefore, the movable disk element 612 can be moved back and forth along the rotary shaft 2 upon loosening the screw B screwed into the threaded hole 21 through the slot 612b. Then, the movable disk element 612 is set at a fixed position on the rotary shaft 2 if the screw B is tightened after adjusting the distance between the stationary disk element 611 and the movable disk element 612.

As the screw B is used as the locking member as discussed above, the locking member can be made in a simple structure and the distance between the stationary disk element 611 and the movable disk element 612 can be properly maintained in a reliable fashion.

The second embodiment shown in FIGS. 5A, 5B, 6A and 6C employs the truncated conical bodies 82 as the centrifugal pendulums 8 of the present invention, each of the truncated conical bodies 82 fitted in one of the mounting holes 72 gradually decreasing in diameter from one side of the partially hollowed disk 62 toward the other side thereof. Each of the adjustment mechanisms 9b includes the adjusting tab 91 fitted in one of the cutout spaces 65 formed in the partially hollowed disk 62 to connect to one of the mounting holes 72, part of the adjusting tab 91 being in contact with the tapered circumferential surface 821 of the pertinent truncated conical body 82, as well as the moving member (adjusting screw 92) for moving the adjusting tab 91 back and forth in the pertinent cutout space 65 along the thickness direction of the partially hollowed disk 62.

In the aforementioned structure, a contact point of each adjusting tab 91 on the tapered circumferential surface 821 of the pertinent truncated conical body 82 varies if each adjusting tab 91 is moved back and forth along the axial direction of the rotary shaft 2 (that is, along the thickness direction of the partially hollowed disk 62) by manipulating the moving member. Thus, the center of gravity position of each truncated conical body 82 shifts in a radial direction of the partially hollowed disk 62 and, as a result, the distance between the center of gravity position of each truncated conical body 82 and the center axis of the rotary shaft 2 varies. This makes it possible to finely adjust the vibration absorbing effect.

In this structure, each of the adjusting screws 92 passed from one side of the partially hollowed disk 62 to the opposite side thereof and screwed into the adjusting tab 91 therethrough in the pertinent cutout space 65 is used as the moving member for moving the adjusting tab 91. It is possible to move each adjusting tab 91 back and forth along the thickness direction of the partially hollowed disk 62 by turning the pertinent adjusting screw 92 clockwise and counterclockwise about the axis thereof.

As each of the adjusting screws 92 is used as the moving member as discussed above, the moving member can be made in a simple structure.

The third embodiment shown in FIGS. 7A, 7B, 8A and 8B employs the conical holes 73 as the mounting holes 7 formed in the thick-walled disk 63 to pass therethrough, each of the conical holes 73 gradually decreasing in diameter from one side of the thick-walled disk 63 toward the other side thereof. Also, this embodiment employs the spherical bodies 81 as the centrifugal pendulums 8, the diameter of each spherical body 81 is made larger than the minimum diameter of each conical hole 73 and the thickness of the thick-walled disk 63.

The adjustment mechanism 9c includes the positioning disk 94 which is located face to face with the thick-walled disk 63 on one side thereof and mounted on the rotary shaft 2 movably along the axial direction thereof on the common axis with the rotary shaft 2, as well as the locking member (screw B) for keeping the positioning disk 94 from moving.

The adjustment mechanism 9c thus configured keeps the spherical bodies 81 from coming off the conical holes 73 with the aid of the positioning disk 94 mounted face to face with the thick-walled disk 63 on one side thereof where each conical hole 73 has the maximum diameter. In this configuration, part of each spherical body 81 protrudes from the pertinent conical hole 73 toward the positioning disk 94.

The amount of projection of the spherical bodies 81 from the thick-walled disk 63 can be varied by moving the positioning disk 94 back and forth along the axial direction of the rotary shaft 2. When the thick-walled disk 63 is caused to rotate about the rotary shaft 2 integrally therewith, the distance between the center axis of the rotary shaft 2 and the center of gravity position of each spherical body 81 varies according to the amount of projection of the spherical bodies 81. This makes it possible to finely adjust the vibration absorbing effect.

The positioning disk 94 has the outer cylindrical part (projecting part) 941 projecting along the axial direction of the rotary shaft 2 from a surface of the positioning disk 94 opposite to a surface thereof facing the thick-walled disk 63. The outer cylindrical part 941 has the slot 942 formed therein, the slot 942 extending along the axial direction of the rotary shaft 2. It is possible to securely fix the positioning disk 94 to the rotary shaft 2 and thus position the spherical bodies 81 in the respective conical holes 73 by tightening the screw B.

As the screw B which is passed through the slot 942 and screwed into the threaded hole 21 is used as the locking member, the locking member can be made in a simple structure.

Figure 9:
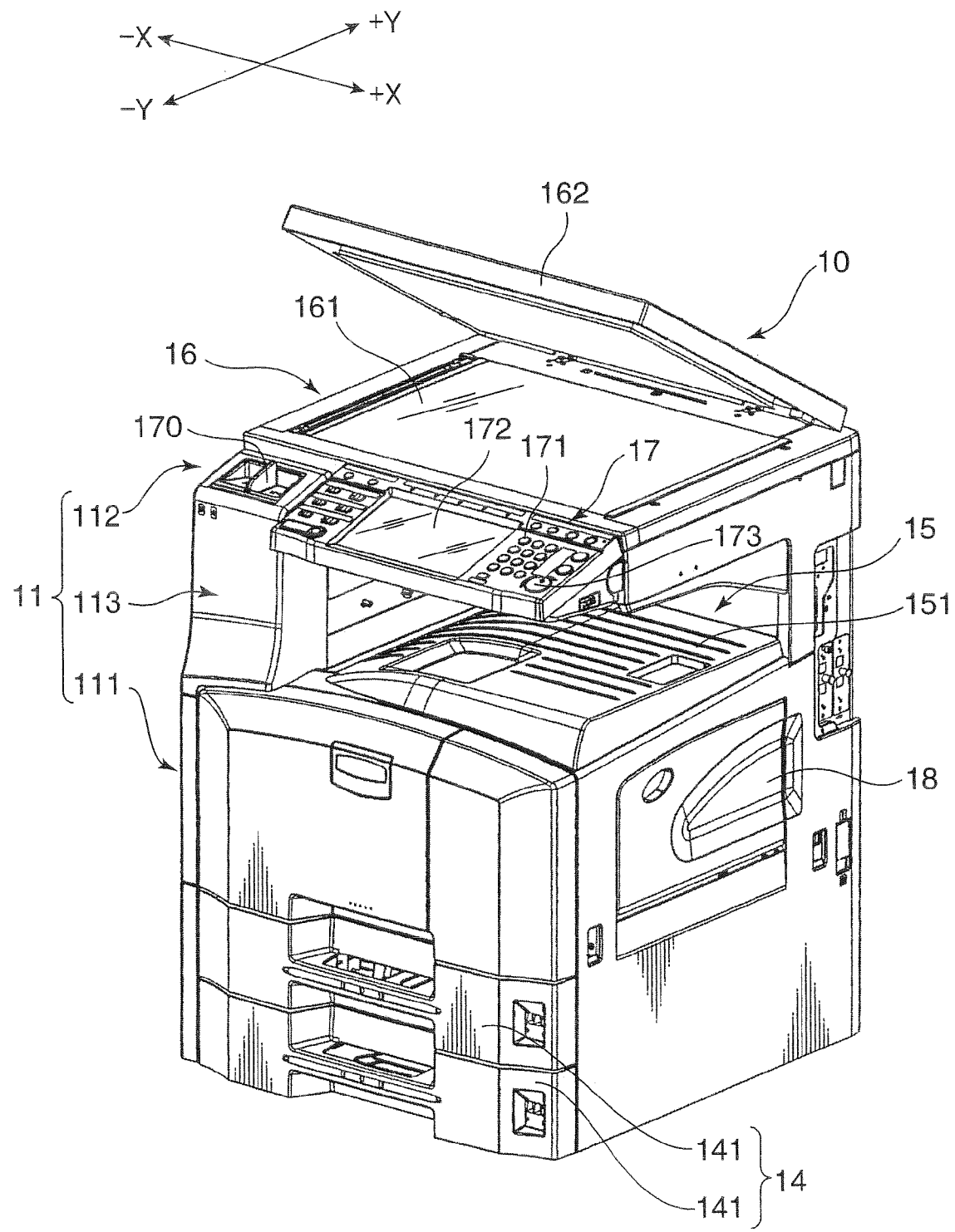
FIG. 9 is a perspective view showing the external appearance of one example of an image forming apparatus according to the invention.
Figure 10:
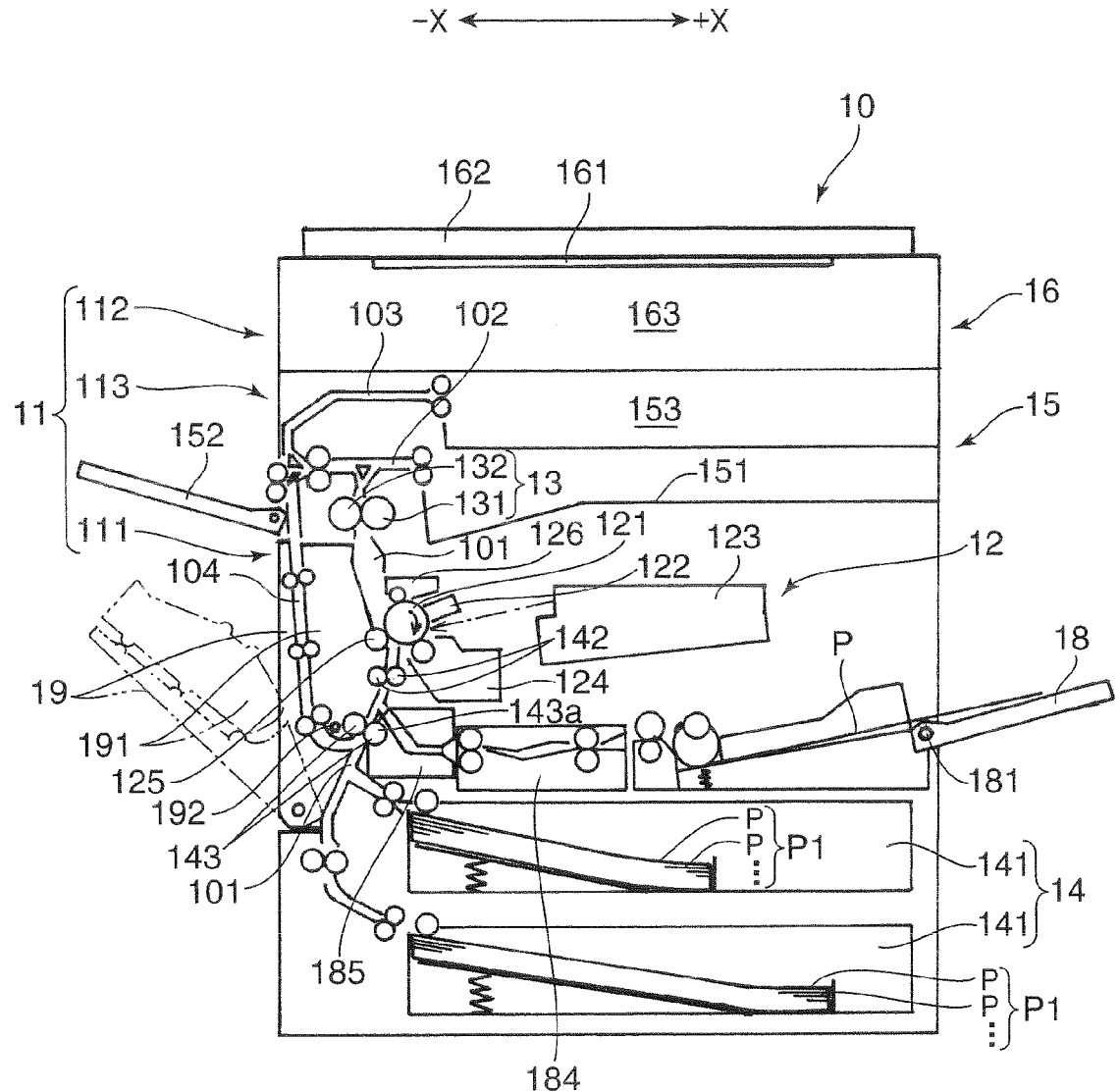
FIG. 10 is a frontal cross-sectional view showing the internal construction of the image forming apparatus of FIG. 9.

An image forming apparatus 10 of the invention employing one of the centrifugal pendulum vibration absorbers 51, 52, 53 of the foregoing first to third embodiments is now described with reference to FIGS. 9 and 10. FIG. 9 is a perspective view showing the external appearance of the image forming apparatus 10 of the fourth embodiment, and FIG. 10 is a frontal cross-sectional view showing the internal construction of the image forming apparatus 10. As depicted in FIGS. 9 and 10, the symbols −X/+X denotes a left-right direction and the symbols −Y/+Y denotes a front-rear direction. In particular, −X represents a leftward direction, +X represents a rightward direction, −Y represents a frontward direction and +Y represents a rearward direction.

The image forming apparatus 10 is a so-called internal exit tray type copying machine having a main apparatus body 11. Referring to FIGS. 9 and 10, the main apparatus body 11 includes an image forming section 12, a fixing section 13, a sheet storage section 14, a sheet discharge section 15, an image reading section 16 and an operating section 17. The sheet discharge section 15 is formed by creating a recessed portion in part of the main apparatus body 11 beneath the image reading section 16. The image forming apparatus 10 is referred to as the internal exit tray type for this reason.

The main apparatus body 11 has a lower body portion 111 having a generally parallelepipedic shape, a generally flat-shaped upper body portion 112 located above the lower body portion 111 face to face therewith, and an interconnecting portion 113 located between the upper body portion 112 and the lower body portion 111. The interconnecting portion 113 is a structural portion erected upright from a left part of the lower body portion 111 for joining the lower body portion 111 and the upper body portion 112 to each other, forming the sheet discharge section 15 therebetween. The upper body portion 112 is supported at a left part thereof on an upper end part of the interconnecting portion 113.

The image forming section 12, the fixing section 13 and the sheet storage section 14 are provided inside the lower body portion 111, while the image reading section 16 is mounted in the upper body portion 112. In this embodiment, the operating section 17 is mounted to the upper body portion 112 in such a manner that the operating section 17 juts out frontward from a front end part of the upper body portion 112 as shown in FIG. 9.

The sheet storage section 14 includes a pair of upper and lower paper cassettes 141 which can be removed from and inserted into the main apparatus body 11. Each of these paper cassettes 141 holds a stack P1 of printing sheets (image carrying media) P. When executing an image forming task (print job), the image forming apparatus 10 pulls out the printing sheets P one after another and feeds each printing sheet P into the image forming section 12 to carry out the image forming task.

The sheet discharge section 15 located between the lower body portion 111 and the upper body portion 112 has an internal discharge tray 151 formed on a top surface of the lower body portion 111. Each printing sheet P carrying a toner image transferred thereto is output from the image forming section 12 and normally delivered onto internal discharge tray 151 from a lower part of the interconnecting portion 113.

The image reading section 16 includes contact glass 161 fitted in an upper opening of the upper body portion 112 for placing a document to be scanned, a document pressing cover 162 which can be swung up and down for holding the document placed on the contact glass 161, and a scanner mechanism 163 for scanning an image of the document placed on the contact glass 161. Analog information concerning the document image read by the scanner mechanism 163 is converted into a digital signal which is output to a later-described exposure unit 123 for execution of the image forming task.

The operating section 17 is for entering information concerning an image forming task to be executed. The operating section 17 includes a power switch 170, numeric keys 171 and various other keys used for entering the number of prints to be produced on the printing sheets (printing media) P, for instance, a liquid crystal display (LCD) panel 172 used for entering information by touch-screen operation and displaying comments, as well as a start key 173 used for initiating the image forming task. When the start key 173 is pressed, the image forming apparatus 10 begins to scan the document image and carries out a sequence of successive steps for performing the image forming task until a specified number of sheets P carrying toner images are output.

Provided on a right side of the lower body portion 111 immediately above the paper storage section 14 is a manual feed tray 18 which is mounted swingably on a pivot shaft 181 at a lower end so that the manual feed tray 18 can be flipped up and down between a closed position at which the manual feed tray 18 closes off a manual feed slot and an open position at which the manual feed tray 18 projects in the rightward direction.

As illustrated in FIG. 10, there are provided a sheet convey unit 184 and an interconnect unit 185 between the manual feed tray 18 and a later-described vertical paper convey path 101. The printing sheet P manually fed from the manual feed tray 18 is led into the vertical paper convey path 101 through the sheet convey unit 184 and the interconnect unit 185 and guided along the vertical paper convey path 101 toward a nipping part formed between a photosensitive drum (toner image carrier) 121 and an image transfer roller 125 which will be described later.

A maintenance door 19 which can be opened and closed is provided on a left side of the lower body portion 111 and an external discharge tray 152 is provided immediately above the maintenance door 19 as illustrated. Upon completion of the print job, the printing sheet P carrying a printed image is ejected selectively onto the internal discharge tray 151 or the external discharge tray 152.

The internal construction of the image forming apparatus 10 is described in greater detail with reference to FIG. 10. As depicted in FIG. 10, the aforementioned photosensitive drum 121 is provided approximately at a middle position of the image forming block 12. While the photosensitive drum 121 rotates in a clockwise direction (as illustrated in FIG. 10) about a drum axis, an outer peripheral surface of the photosensitive drum 121 is uniformly charged by a charging unit 122 which is located immediately to the right of the photosensitive drum 121.

The exposure unit 123 produces a laser beam based on image information representative of the document image read by the image reading section 16. The exposure unit 123 radiates the laser beam onto the outer peripheral surface of the photosensitive drum 121 to form an electrostatic latent image thereon. As developer (hereinafter referred to as toner) is supplied from a developing unit 124 provided below the photosensitive drum 121 to the electrostatic latent image subsequently, a toner image having the same pattern as the electrostatic latent image is formed on the outer peripheral surface of the photosensitive drum 121.

The printing sheet P supplied from one of the paper cassettes 141 of the sheet storage section 14 is fed along the vertically extending vertical paper convey path 101 up to the photosensitive drum 121 on which the toner image is formed through a pair of registration rollers 142 which together serve to feed the printing sheet P with correct timing. The toner image on the outer peripheral surface of the photosensitive drum 121 is transferred to the printing sheet P by the aforementioned image transfer roller 125 which is located to the left of the photosensitive drum 121 face to face therewith. The printing sheet P carrying the toner image thus transferred is fed from the photosensitive drum 121 into the fixing section 13.

As the photosensitive drum 121 continues to rotate in the clockwise direction upon completion of the aforementioned image transfer process, the outer peripheral surface of the photosensitive drum 121 is cleaned by a cleaning unit 126 which is provided immediately above the photosensitive drum 121. Then, the outer peripheral surface of the rotating photosensitive drum 121 is charged again by the charging unit 122 in preparation of a succeeding image forming task.

The fixing section 13 has a housing accommodating a fixing roller 131 having a built-in electric heating element, such as a halogen lamp, and a pressure roller 132 located to the left of the fixing roller 131 face to face therewith. As the printing sheet P fed from the image forming section 12 passes through a nipping part between the fixing roller 131 and the pressure roller 132, the printing sheet P receives heat and, as a result, the toner image is fixed to the printing sheet P.

In the case of a single-sided print job, the printing sheet P carrying a printed image on one side is ejected selectively onto the internal discharge tray 151 in the sheet discharge section 15 or the external discharge tray 152 through a sheet discharge path 102 provided above the fixing section 13.

In the case of a double-sided print job, the printing sheet P carrying a printed image on one side only is sent toward a temporary sheet accommodating space 153, formed above the internal discharge tray 151, through a switchback paper convey path 103 which is provided above the sheet discharge path 102 up to a point where a forward half portion of the printing sheet P sticks out into the temporary sheet accommodating space 153. Then, the printing sheet P is fed in an opposite direction through a vertically extending reversing paper convey path 104 provided on the inside of the maintenance door 19 and fed again into the image forming section 12 with the printing sheet P reversed for printing an image on a reverse side of the printing sheet P. Upon completion of the double-sided print job, the printing sheet P carrying the printed images on both sides is discharged selectively onto the internal discharge tray 151 or the external discharge tray 152.

The maintenance door 19 is provided with a cover member 191 which is located immediately to the right of the reversing paper convey path 104, facing a left side of the image forming section 12. This cover member 191 is held on a right side of the maintenance door 19. The vertical paper convey path 101 for feeding the printing sheet P from one of the paper cassettes 141 or the manual feed tray 18 is configured such that part of the vertical paper convey path 101 is located between a right side of the cover member 191 and the left side of the image forming section 12 under conditions where the cover member 191 is in a closed position.

A reason why the maintenance door 19 is provided is as follows. If a paper jam occurs in part of the vertical paper convey path 101 located at the left side of the image forming section 12, a user (or service personnel) can flip down the maintenance door 19 to an open position to expose the vertical paper convey path 101 so that the printing sheet P which has jammed can easily be located and removed.

Figure 11:
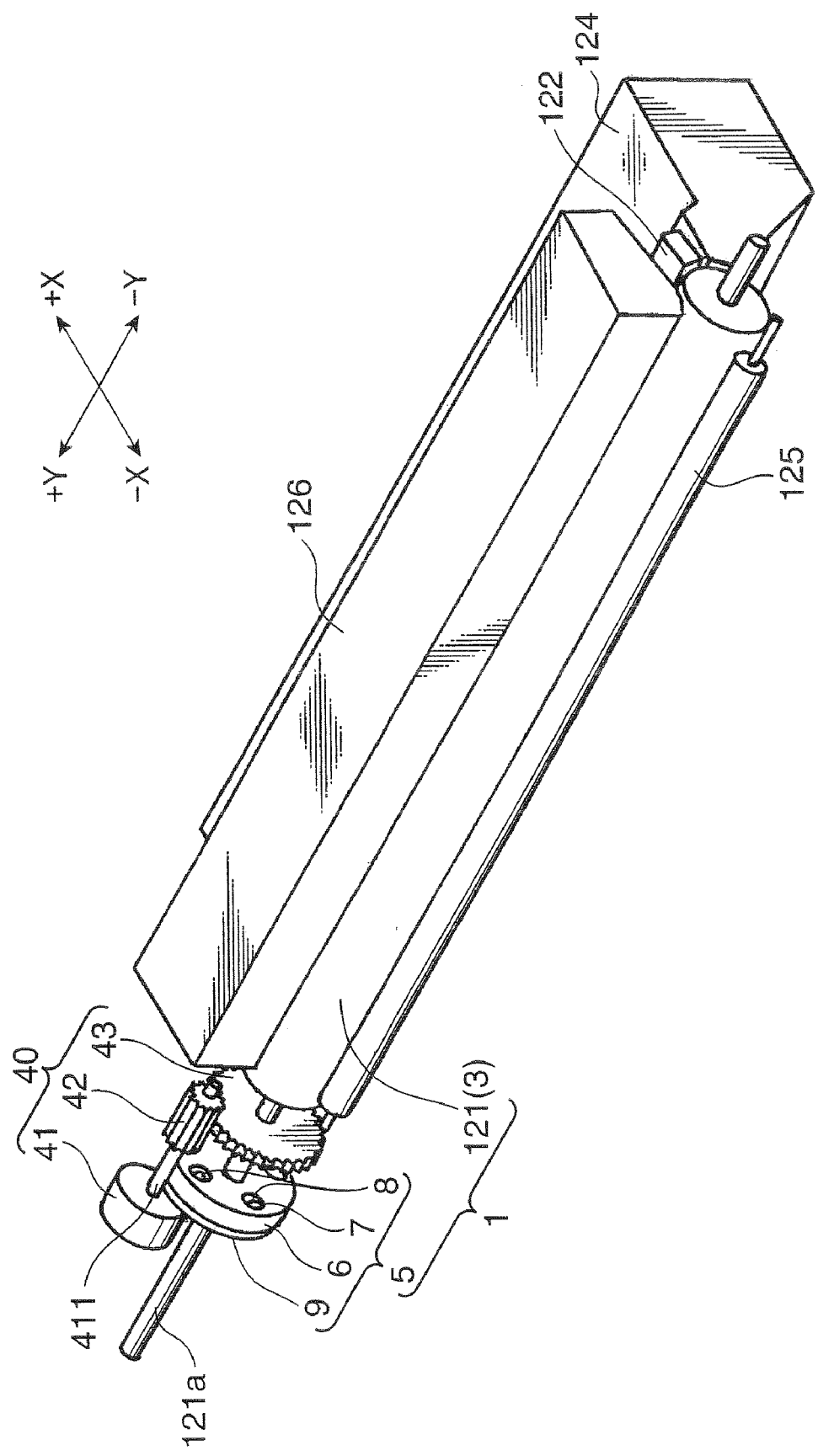
FIG. 11 is a perspective view showing an example of a driving system of a photosensitive drum and the centrifugal pendulum vibration absorber applied to the photosensitive drum.

The photosensitive drum 121 of the image forming apparatus 10 thus configured is an example of the rotary driving device 1 (FIG. 1) of the present invention, and the centrifugal pendulum vibration absorber 5 (one of the centrifugal pendulum vibration absorbers 51, 52, 53, hereinafter referred to simply as the centrifugal pendulum vibration absorber 5 collectively) is applied to the photosensitive drum 121. Referring to FIG. 11 and other drawings where necessary, the centrifugal pendulum vibration absorber 5 employed in the photosensitive drum 121 is now described hereinbelow.

FIG. 11 is a perspective view showing an example of a driving system 40 of the photosensitive drum 121 and the centrifugal pendulum vibration absorber 5 applied to the photosensitive drum 121. The symbols −X/+X and −Y/+Y in FIG. 11 denote the same left-right and front-rear directions, respectively, as previously explained with reference to FIG. 9, −X representing the leftward direction, +X representing the rightward direction, −Y representing the frontward direction and +Y representing the rearward direction.

As shown in FIG. 11, the photosensitive drum 121 has a drum shaft 121a passing along the drum axis so that the photosensitive drum 121 can rotate integrally with the drum shaft 121a on a common axis. The drum shaft 121a is fitted rotatably about the axis thereof between front and rear unillustrated frames provided in the lower body portion 111 of the main apparatus body 11, whereby the photosensitive drum 121 is mounted at a specified position in the main apparatus body 11. The drum shaft 121a corresponds to the rotary shaft 2 of the earlier-described basic structure and the first to third embodiments shown in FIGS. 1 to 8B.

The driving system 40 of the photosensitive drum 121 includes a driving motor 41 supported parallel to the front-rear direction by the unillustrated frame in the lower body portion 111, a driving gear 42 having a small diameter mounted on a drive shaft 411 of the driving motor 41 on a common axis therewith so that the driving gear 42 can rotate integrally with the drive shaft 411, and a driven gear 43 having a larger diameter than the driving gear 42 and mounted on the drum shaft 121a on a common axis therewith so that the driven gear 43 can rotate integrally with the drum shaft 121a, wherein dimensions of the driving gear 42 and the driven gear 43 are so determined that the two gears 42, 43 properly mesh with each other.

When the driving motor 41 is actuated, a driving force of the driving motor 41 is transmitted to the driven gear 43 via the drive shaft 411 and the driving gear 42 with a turning speed of the driven gear 43 reduced from that of the driving motor 41. Consequently, the driven gear 43 rotates integrally with the drum shaft 121a on the common axis, causing the photosensitive drum 121 to rotate. The driving gear 42 and the driven gear 43 together constitute a mechanism corresponding to the gear mechanism 4a of the basic structure of the rotary driving device 1 shown in FIG. 1.

The centrifugal pendulum vibration absorber 5 of the present invention is mounted between the driven gear 43 and the driving motor 41 at the rear of the photosensitive drum 121 in such a manner that the centrifugal pendulum vibration absorber 5 can rotate integrally with the drum shaft 121a on the common axis. The centrifugal pendulum vibration absorber 5 is mounted at the aforementioned location because it is preferable that the centrifugal pendulum vibration absorber 5 be located as close as possible to the driving system 40, which is a source of vibration, for effectively producing a vibration absorbing effect. Specifically, employed as the centrifugal pendulum vibration absorber 5 is one of the centrifugal pendulum vibration absorbers 51, 52, 53 of the foregoing first to third embodiments shown in FIGS. 3A to 8B.

The centrifugal pendulum vibration absorber 5 is provided with the adjustment mechanism 9 on a rear side of the disk 6 for adjusting the radial position of each centrifugal pendulum 8. This arrangement makes it possible to easily adjust the radial position of each centrifugal pendulum 8 by means of the adjustment mechanism 9 from a rear side of the lower body portion 111. Specifically, employed as the adjustment mechanism 9 is one of the adjustment mechanisms 9a, 9b, 9c of the foregoing first to third embodiments shown in FIGS. 3A to 8B.

The photosensitive drum 121 of the image forming apparatus 10 is an example of the rotary load body 3 shown in FIG. 1, and the photosensitive drum 121 and the centrifugal pendulum vibration absorber 5 together constitute the rotary driving device 1 of the present invention.

Since the photosensitive drum 121 is provided with the centrifugal pendulum vibration absorber 5 of this invention, vibration produced by the driving system 40 when the same is operated is effectively absorbed by the centrifugal pendulum vibration absorber 5. Also, even if the mounting holes 7 deviate from intended positions due to errors in design or manufacture or the driving system 40 vibrates in a state different from what has been expected due to local conditions, for instance, pendular motion of the centrifugal pendulums 8 fitted in the mounting holes 7 can be properly controlled by finely adjusting the positions of the centrifugal pendulums 8 in radial directions by means of the adjustment mechanism 9. Thus, the centrifugal pendulum vibration absorber 5 can produce a sufficient vibration absorbing effect. Accordingly, the aforementioned arrangement of the invention makes it possible to effectively prevent the occurrence of such an inconvenient situation that an image can not be properly formed on the outer peripheral surface of the photosensitive drum 121 due to vibration thereof.

It should be recognized that the invention is not limited to the foregoing embodiments but includes various modifications and variations thereof as described hereinbelow, for example.

While the rotary driving device 1 shown in FIG. 1 includes the driving motor 4 and the gear mechanism 4a mounted on one end of the rotary shaft 2 and the centrifugal pendulum vibration absorber 5 mounted on the other end of the rotary shaft 2, the driving motor 4, the gear mechanism 4a and the centrifugal pendulum vibration absorber 5 may be mounted on the same end of the rotary shaft 2. In this variation, the source of vibration and a vibration absorbing part are located closer to each other, making it possible to obtain a greater vibration absorbing effect.

The centrifugal pendulum vibration absorbers 51, 53 of the first and third embodiments include the adjuster 613 mounted between the stationary disk element 611 and the movable disk element 612 and between the thick-walled disk 63 and the positioning disk 94, respectively. The adjuster 613 is not absolutely necessary, however. It is possible to eliminate the adjuster 613 if the movable disk element 612 or the positioning disk 94 is reliably mounted at a fixed position on the rotary shaft 2 by securely tightening the screw B.

While the four mounting holes 7 are formed in the disk 6 (one of the disks 61, 62, 63 of the first to third embodiments), the number of the mounting holes 7 is not limited to four but may be less than or more than four.

While the invention has been described with reference to the illustrative embodiment in which the image forming apparatus 10 having the photosensitive drum 121 applied with the centrifugal pendulum vibration absorber 5 is a copying machine, the image forming apparatus 10 of the invention is not limited to the copying machine but may be a printer which simply performs a print job based on image information fed from an external apparatus like a computer or a facsimile machine which performs a print job based on image information fed through a communications line, for example.

While the printing sheet P used as an image carrying medium in the image forming apparatus 10 of the foregoing embodiment is a sheet of paper, the image carrying medium is not limited to the sheet of paper in this invention. For example, the image carrying medium may be a transparent plastic sheet used in an overhead projector or an image transfer belt to which toner images of different colors once formed on the outer peripheral surface of the photosensitive drum 121 are transferred for color printing. In the latter case, the color images transferred to the image transfer belt one on top of another are eventually together retransferred to a sheet of paper or a transparent plastic sheet.

While the invention has thus far been described with reference to the illustrative embodiments thereof, principal arrangements and features of the invention can be summarized as follows.

In one preferable form of the invention, a rotary driving device includes a rotary shaft supported rotatably about an axis thereof on a predetermined supporting member, a rotary load body mounted on the rotary shaft to project radially outward from the rotary shaft in such a manner that the rotary load body can rotate integrally with the rotary shaft about the axis thereof, a driver for rotating the rotary shaft about the axis thereof, a disk mounted on the rotary shaft coaxially therewith for integral rotation with the rotary shaft, the disk having a mounting hole formed therein, a pendulum loosely fitted in the mounting hole, and an adjustment mechanism for adjusting a relative position relationship between a central axis position of the mounting hole and a center of gravity position of the pendulum under conditions where the disk is rotating.

According to the rotary driving device thus configured, the disk rotates about the rotary shaft concentrically therewith when the driver is actuated, so that vibrational energy of the rotary driving device is absorbed by pendular motion (oscillatory motion) of the pendulum fitted in the mounting hole formed in the disk. This serves to suppress vibration of the rotary driving device. If the oscillatory motion of the pendulum does not produce an initially intended level of vibration absorbing effect, the relative position relationship between the central position of the mounting hole and the center of gravity of the pendulum is varied by manipulating the adjustment mechanism and the vibration absorbing effect thus produced is reconfirmed repetitively on a trial-and-error basis. By this adjustment process, it is possible to make the frequency of vibration of the rotary driving device equal to the natural frequency of vibration of the pendulum, so that oscillatory motion of the rotary driving device is effectively absorbed.

Also, even after the disk having the mounting hole in which the pendulum is loosely fitted is once mounted on the rotary shaft, it is possible to effectively suppress vibration of the rotary driving device by manipulating the adjustment mechanism if the desired vibration absorbing effect is not obtained. Therefore, unlike the case of a conventional arrangement, it is not necessary to replace the disk or the pendulum with new ones when the desired vibration absorbing effect is not obtained. This makes it possible to effectively prevent the occurrence of such an inconvenient situation that replacement of components results in a cost increase. Additionally, as one can quickly enhance vibration absorbing performance according to the structure of the invention, it is possible to ensure that the rotary driving device constantly produces the desired vibration absorbing effect.

In the rotary driving device of the above structure, preferably, the central axis of the mounting hole is set to be parallel to the axis of the rotary shaft, the pendulum is caused to move radially outward within the mounting hole due to a centrifugal force produced by rotary motion of the disk, and the adjustment mechanism adjusts the relative position relationship between the central axis position of the mounting hole and the center of gravity position of the pendulum under conditions where the pendulum is moved radially most outward in the mounting hole.

In the rotary driving device of the above structure, preferably, the adjustment mechanism goes into contact with the pendulum to regulate the amount of radially outward movement of the pendulum within the mounting hole, thereby adjusting the relative position relationship between the central axis position of the mounting hole and the center of gravity position of the pendulum.

The following description deals with specific arrangements for adjusting the relative position relationship between the central axis position of the mounting hole and the center of gravity position of the pendulum.

In the rotary driving device of the above structure, preferably, the disk includes a stationary disk element fixedly mounted on the rotary shaft and a movable disk element slidably mounted on the rotary shaft, the mounting hole is made of a first mounting hole formed in the stationary disk element and a second mounting hole formed in the movable disk element so as to accommodate the pendulum between the first and second mounting holes, the pendulum is a spherical body having a diameter larger than a minimum diameter of the mounting hole and the spherical body is fitted in the mounting hole while being sandwiched between the stationary disk element and the movable disk element, and the adjustment mechanism includes the movable disk element sliding on the rotary shaft to go into contact with the pendulum through the second mounting hole and a locking member keeping the movable disk element from moving.

According to the rotary driving device thus configured, the distance between the stationary disk element and the movable disk element varies when the movable disk element is moved back and forth along the rotary shaft. It is therefore possible to vary the distance between the central axis of the rotary shaft and the center of gravity of the pendulum under conditions where the centrifugal force produced by rotation of the rotary shaft is exerted on the spherical body sandwiched between the stationary and movable disk elements. It is possible to improve the vibration absorbing effect by adjusting the distance between the two disk elements in the aforementioned fashion.

In the rotary driving device of the above structure, preferably, the movable disk element includes a facing surface facing the stationary disk element, an opposite surface opposite to the facing surface and a protrusion part protruding from the opposite surface in a direction in which the rotary shaft extends, the projecting part has a slot so formed as to extend in the direction in which the rotary shaft extends, the rotary shaft has a peripheral surface formed with a threaded hole corresponding to the slot, and the locking member is a screw screwed into the threaded hole through the slot.

According to the rotary driving device thus configured, the movable disk element can be moved back and forth along the rotary shaft upon loosening the screw screwed into the threaded hole through the slot formed in the projecting part of the movable disk element. Then, the movable disk element is set at a fixed position on the rotary shaft if the screw is tightened after adjusting the distance between the stationary d is k element and the movable disk element.

As the screw is used as the locking member as discussed above, the locking member can be made in an extremely simple structure and the distance between the stationary disk element and the movable disk element thus adjusted can easily be maintained.

In the rotary driving device of the above structure, the disk has one and the other surfaces facing in opposite directions, the pendulum is a truncated conical body having a tapered peripheral surface that has a diameter gradually decreasing from the one surface toward the other surface, the disk has a cutout space formed therein by cutting out a portion of the disk from an outer peripheral surface thereof toward the mounting hole, and the adjustment mechanism includes an adjusting tab mounted in the cutout space and going into contact with the tapered peripheral surface of the truncated conical body and a moving member moving the adjusting tab back and forth along a thickness direction of the disk.

According to the rotary driving device thus configured, a contact point of the adjusting tab on the tapered circumferential surface of the truncated conical body varies if the adjusting tab is moved back and forth along the axial direction of the rotary shaft (that is, along the thickness direction of the disk) by manipulating the moving member due to the centrifugal force produced by rotation of the disk about the rotary shaft. As a result, the center of gravity position of the truncated conical body moves along a radial direction of the disk and the distance between the center of gravity position of the truncated conical body and the central axis of the rotary shaft varies. This makes it possible to finely adjust the vibration absorbing effect of the rotary driving device.

In the rotary driving device of the above structure, preferably, the moving member is an adjusting screw passing through the disk from the one surface to the other surface while passing through the adjusting tab mounted in the cutout space.

According to the rotary driving device thus configured, the adjusting tab can be moved back and forth along the thickness direction of the disk by turning the adjusting screw clockwise and counterclockwise about an axis thereof. It is possible to make the moving member in a simple structure by using the adjusting screw as the moving member as mentioned above.

In the rotary driving device, preferably, the disk has first and second surfaces facing in opposite directions, the mounting hole is a conical hole having a diameter gradually increasing from the first surface toward the second surface, the pendulum is a spherical body having a diameter larger than both a minimum diameter of the conical hole and the thickness of the disk, and the adjustment mechanism includes a positioning disk arranged in face to face relation with the second surface and slidably and coaxially fitted on the rotary shaft and a locking member keeping the positioning disk from moving.

This configuration serves to keep the spherical body from coming off the conical hole with the aid of the positioning disk mounted face to face with the first surface of the disk where the conical hole has the minimum diameter. In this condition, part of the spherical body protrudes from the conical hole toward the positioning disk.

The amount of projection of the spherical body from the conical hole in the disk can be varied by moving the positioning disk along the axial direction of the rotary shaft. Thus, when the disk is caused to rotate about the rotary shaft integrally therewith, the distance between the center axis of the rotary shaft and the center of gravity position of the spherical body varies according to the amount of projection of the spherical body. This makes it possible to finely adjust the vibration absorbing effect of the rotary driving device.

In the rotary driving device of the above structure, preferably, the positioning disk includes a facing surface facing the disk, an opposite surface opposite to the facing surface and a protrusion part protruding from the opposite surface in a direction in which the rotary shaft extends, the projecting part has a slot so formed therein as to extend in the direction in which the rotary shaft extends, the rotary shaft has a peripheral surface formed with a threaded hole corresponding to the slot, and the locking member is a screw screwed into the threaded hole through the slot.

In the rotary driving device thus configured, it is possible to affix the positioning disk to the rotary shaft and thereby set the spherical body in position by tightening the screw fitted in the threaded hole in the rotary shaft. Since the screw is screwed into the threaded hole in the rotary shaft through the slot in the projecting part of the positioning disk, it is possible to move the positioning disk back and forth along the axial direction of the rotary shaft. As the screw is used as the locking member as discussed above, the locking member can be made in a simple structure.

What is claimed is:

1. A rotary driving device comprising:
a rotary shaft supported rotatably about an axis thereof on a predetermined supporting member;
a rotary load body mounted on the rotary shaft to project radially outward from the rotary shaft in such a manner that the rotary load body can rotate integrally with the rotary shaft about the axis thereof;
a driver for rotating the rotary shaft about the axis thereof;
a disk mounted on the rotary shaft coaxially therewith for integral rotation with the rotary shaft, the disk having a stationary disk element fixedly mounted on the rotary shaft and a moveable disk element slidably mounted on the rotary shaft, first and second mounting holes formed respectively in the stationary and moveable disk elements, the first and second mounting holes being aligned along a central axis set parallel to the axis of the rotary shaft;
a spherical pendulum having a diameter larger than minimum diameters of the first and second mounting holes, the pendulum being loosely fitted in the mounting holes while being sandwiched between the stationary disk element and the movable disk element, the pendulum being caused to move radially outward within the mounting holes due to a centrifugal force produced by rotary motion of the disk on the rotary shaft; and
an adjustment mechanism for adjusting a relative position relationship between a central axis position of the mounting hole and a center of gravity position of the pendulum under conditions where the disk is rotating, the adjustment mechanism including the movable disk element sliding on the rotary shaft and into contact with the pendulum through the second mounting hole and a locking member for keeping the movable disk element from moving, wherein
the adjustment mechanism adjusts the relative position relationship between the central axis position of the mounting holes and the center of gravity position of the pendulum under conditions where the pendulum is moved radially most outward in the mounting holes, and
the adjustment mechanism goes into contact with the pendulum to regulate the amount of radially outward movement of the pendulum within the mounting holes, thereby adjusting the relative position relationship between the central axis position of the mounting holes and the center of gravity position of the pendulum.

2. The rotary driving device according to claim 1, wherein the movable disk element includes a facing surface facing the stationary disk element, an opposite surface opposite to the facing surface and a protrusion part protruding from the opposite surface in a direction in which the rotary shaft extends, the projecting part having a slot so formed as to extend in the direction in which the rotary shaft extends,
wherein the rotary shaft has a peripheral surface formed with a threaded hole corresponding to the slot, and
wherein the locking member is a screw screwed into the threaded hole through the slot.
wherein the adjustment mechanism includes a positioning disk arranged in face to face relation with the second surface and slidably and coaxially fitted on the rotary shaft and a locking member keeping the positioning disk from moving.

3. An image forming apparatus comprising:
a photosensitive drum driven to rotate about a drum axis and having a peripheral surface on which an electrostatic latent image is formed based on image information and then a toner image having the same pattern as the electrostatic latent image is formed, the photosensitive drum transferring the toner image to an image carrying medium while rotating about the drum axis; and
a rotary driving device for driving the photosensitive drum to rotate, the rotary driving device including:
a rotary shaft supported rotatably about an axis thereof on a predetermined supporting member and supporting rotatably the photosensitive drum for integrally rotation;
a driver for rotating the rotary shaft about the axis thereof;
a disk mounted on the rotary shaft coaxially therewith for integral rotation with the rotary shaft, the disk having a stationary disk element fixedly mounted on the rotary shaft, a moveable disk element slidably mounted on the rotary shaft, first and second mounting holes formed respectively in the stationary and moveable disk elements, the first and second mounting holes being aligned along a central axis set parallel to the axis of the rotary shaft;
a spherical pendulum having a diameter larger than minimum diameters of the first and second mounting holes, the pendulum being loosely fitted in the mounting holes while being sandwiched between the stationary disk element and the movable disk element, the pendulum being caused to move radially outward within the mounting hole due to a centrifugal force produced by rotary motion of the disk on the rotary shaft; and
an adjustment mechanism for adjusting a relative position relationship between a central axis position of the mounting hole and a center of gravity position of the pendulum under conditions where the disk is rotating, the adjustment mechanism including the movable disk element sliding on the rotary shaft to go into contact with the pendulum through the second mounting hole and a locking member for keeping the movable disk element from moving, wherein
the adjustment mechanism adjusts the relative position relationship between the central axis position of the mounting holes and the center of gravity position of the pendulum under conditions where the pendulum is moved radially most outward in the mounting holes, and
the adjustment mechanism contacts the pendulum to regulate the amount of radially outward movement of the pendulum within the mounting holes, thereby adjusting the relative position relationship between the central axis position of the mounting holes and the center of gravity position of the pendulum.

4. The image forming apparatus according to claim 3, wherein the movable disk element includes a facing surface facing the stationary disk element, an opposite surface opposite to the facing surface and a protrusion part protruding from the opposite surface in a direction in which the rotary shaft extends, the projecting part having a slot so formed as to extend in the direction in which the rotary shaft extends,
wherein the rotary shaft has a peripheral surface formed with a threaded hole corresponding to the slot, and
wherein the locking member is a screw screwed into the threaded hole through the slot.

* * * * *